(12) United States Patent
Schlenk

(10) Patent No.: US 8,295,282 B2
(45) Date of Patent: Oct. 23, 2012

(54) METHOD AND APPARATUS FOR MAC ADDRESS LEARNING

(75) Inventor: Ralph Schlenk, Erlangen (DE)

(73) Assignee: Alcatel Lucent, Paris (FR)

( * ) Notice: Subject to any disclaimer, the term of this patent is extended or adjusted under 35 U.S.C. 154(b) by 111 days.

(21) Appl. No.: 12/079,341

(22) Filed: Mar. 26, 2008

(65) Prior Publication Data

US 2008/0240106 A1 Oct. 2, 2008

(30) Foreign Application Priority Data

Mar. 30, 2007 (EP) .................................... 07251433

(51) Int. Cl.
*H04L 12/28* (2006.01)
*H04L 12/56* (2006.01)

(52) U.S. Cl. ........ 370/392; 370/359; 370/360; 370/389; 370/395.31; 370/428

(58) Field of Classification Search .................. 370/360, 370/382, 386, 389, 392, 395.31, 395.32, 370/395.4, 428, 476, 503, 359
See application file for complete search history.

(56) References Cited

U.S. PATENT DOCUMENTS

| | | | | |
|---|---|---|---|---|
| 6,101,188 A * | 8/2000 | Sekine et al. | | 370/401 |
| 6,108,702 A * | 8/2000 | Wood | | 709/224 |
| 6,477,150 B1 * | 11/2002 | Maggenti et al. | | 370/312 |
| 6,519,248 B1 * | 2/2003 | Valko | | 370/352 |
| 6,735,198 B1 * | 5/2004 | Edsall et al. | | 370/389 |
| 6,763,023 B1 * | 7/2004 | Gleeson et al. | | 370/392 |
| 7,139,267 B2 * | 11/2006 | Lu et al. | | 370/386 |
| 7,257,134 B2 * | 8/2007 | Yik et al. | | 370/509 |
| 7,310,815 B2 * | 12/2007 | Yanovsky | | 726/13 |
| 7,359,389 B2 * | 4/2008 | Kusayanagi | | 370/401 |
| 7,583,616 B2 * | 9/2009 | Moreels et al. | | 370/254 |
| 7,693,164 B1 * | 4/2010 | Busch et al. | | 370/401 |
| 7,697,525 B2 * | 4/2010 | Zelig et al. | | 370/390 |
| 2004/0114588 A1 * | 6/2004 | Bhaskaran | | 370/389 |
| 2006/0023724 A1 * | 2/2006 | Na et al. | | 370/395.53 |
| 2006/0114922 A1 * | 6/2006 | Kim et al. | | 370/419 |
| 2006/0262791 A1 * | 11/2006 | Kadambi et al. | | 370/389 |
| 2007/0268915 A1 * | 11/2007 | Zelig et al. | | 370/401 |
| 2008/0031266 A1 * | 2/2008 | Tallet et al. | | 370/401 |
| 2008/0049621 A1 * | 2/2008 | McGuire et al. | | 370/236.2 |
| 2008/0240106 A1 * | 10/2008 | Schlenk | | 370/392 |
| 2008/0285437 A1 * | 11/2008 | Polland | | 370/219 |

OTHER PUBLICATIONS

EP Search Report corresponding to EP 07251433.4-2416, Sep. 3, 2007, Lucent Technologies Inc.

(Continued)

*Primary Examiner* — Michael Thier
*Assistant Examiner* — Benjamin H Elliott, IV
(74) *Attorney, Agent, or Firm* — Wall & Tong, LLP

(57) ABSTRACT

The invention includes a method and apparatus for synchronizing line card forwarding databases. A method includes receiving a data packet at a line card, generating a control packet for each of at least one other line card to enable an address update operation thereat, and propagating the at least one control packet toward the at least one other line card. The control packet, or packets, is generated in response to a determination to perform an address update operation for the received data packet. The address update process may be implemented as an ingress address update process or an egress address update process. This address update process performed in conjunction with an address aging process.

23 Claims, 14 Drawing Sheets

OTHER PUBLICATIONS

The Institute of Electrical and Electronics Engineers, Inc. (IEEE): "IEEE 802.1D Media Access Control (MAC) Bridges" [Online] Jun. 9, 2004, pp. 41-48, XP002446660, IEEE STD 802.1D, ISBN: 0-7381-3982-3, Retrieved from the Internet: URL:http://ieeexplore.ieee.org/ie15/9155/29062/01309630.pdf?tp=&isnumber=29062&arnumber=2309630.[retrieved on Aug. 8, 2007].

The Institute of Electrical and Electronics Engineers, Inc. (IEEE): "IEEE 802.1Q Virtual Bridged Local Area Networks" [Online] May 19, 2006, pp. 51-65, XP002446668, IEEE Std 802.1Q, ISBN: 0-7381-4877-6, Retrieved from the Internet: URL:http://ieeexplore.ieee.org/ie15/10905/34308/01637340.pdf?tp=^isnumber=34308&arnumber=1637340>[retrieved on Aug. 8, 2007].

NP-1C 10-Gigabit 7-Layer Network Processor with Integrated Search Engines, EZchip Technologies, product brief; printed from www.EZchip.com in Apr. 2007.

Xelerator X11 Network Processors; Product Brief; printed from www.xelerated.com in Apr. 2007.

IEEE Standards; 802.1Q, IEEE Standards for Local and Metropolitan Area Networks—Virtual Bridged Local Area Networks; May 7, 2003, pp. 1-312.

IEEE Standards; 802.1D; IEEE Standard for Local and Metropolitan Area Networks; Media Access Control (MAC) Bridges, Jun. 9, 2004, pp. 1-269.

IEEE P802.1ad/D5.1; Draft Standard for Local and Metropolitan Area Networks; Virtual Bridged Local Area Networks—Amendment 4: Provider Bridges; May 12, 2005, pp. 1-79.

IEEE P802.1Q-REV/D4.0; Draft Standard for Local and Metropolitan Area Networks; Virtual Bridged Local Area Networks—Revision; May 19, 2005, pp. 1-303.

Mar. 12, 2012 Office Action in CN 200810090930.5, Lucent Technologies Inc., Applicant, 5 pages.

* cited by examiner

100

200

110

400

406

800

900

1000

1100

1200

1300

US 8,295,282 B2

METHOD AND APPARATUS FOR MAC ADDRESS LEARNING

CROSS-REFERENCE TO RELATED APPLICATIONS

This application claims the benefit under 35 U.S.C. §119 of European Patent Application Serial No. 07251433.4, filed on Mar. 30, 2007, which is incorporated herein by reference in its entirety.

FIELD OF THE INVENTION

The invention relates to the field of communication networks and, more specifically, to Media Access Control (MAC) address learning.

BACKGROUND OF THE INVENTION

Ethernet is a frame-based networking technology for Local Area Networks (LANs). Ethernet networks use Ethernet switches to connect LANs. Ethernet switches uses Media Access Control (MAC) addresses, unique identifiers assigned to nodes of a network, to forward Ethernet frames from source nodes to destination nodes. MAC address learning is a basic property of bridged Ethernet networks, as defined in standards such as Institute of Electrical and Electronics Engineers (IEEE) 802.1Q-2003 (clause 8.7) and IEEE 802.1D-2004 (clause 7.8). MAC address learning is performed in order to maintain forwarding tables for use in forwarding frames, i.e., such that frames received at ingress ports of an Ethernet switch can be forwarded to the correct egress ports of the Ethernet switch.

An Ethernet switch having a control plane performing control functions and a forwarding plane performing frame forwarding functions is often partitioned into several Ethernet bridges spanning several physical line cards. Since MAC address learning is performed using a Forwarding Database, physical distribution of Ethernet bridges in existing Ethernet switches is implemented as a Master Forwarding Database maintained in the control plane and Local Forwarding Databases maintained in the forwarding plane. The Local Forwarding Databases are updated from the Master Forwarding Database. Specifically, line cards forward database updates to a central control processor which maintains the Master Forwarding Database. The central control processor distributes database updates from the Master Forwarding Database to Local Forwarding Databases maintained by each of the line cards, respectively.

MAC address learning may generate very large amounts of information. For example, if only previously unlearned addresses arrive at a 10 GBps Ethernet port (e.g., due to network reconfigurations), more than sixteen million learning requests per second may be generated for this Ethernet port alone. Disadvantageously, while processing such a high volume of learning requests may be feasible in non-distributed MAC address learning (where learning requests are concentrated on a single line card), processing such a high volume of learning requests may not be feasible in distributed MAC address learning. Furthermore, discarding such learning requests degrades overall network performance (because unlearned MAC addresses result in additional flooding of Ethernet traffic).

Disadvantageously, however, due to limited bandwidth between the line cards and the central control processor, the highly complex control path is only able to handle a small fraction of the forwarding path bandwidth. Since the control path is only able to handle a small fraction of the forwarding path bandwidth, many learning requests are dropped, resulting in network degradation. Furthermore, as demand for bandwidth in high-capacity Ethernet equipment continues to increase, while price pressures continue to drive reductions in control plane complexity, dropping of learning requests (and the resulting network degradation) is exacerbated.

SUMMARY OF THE INVENTION

Various deficiencies in the prior art are addressed through the invention of a method and apparatus for synchronizing line card forwarding databases. A method includes receiving a data packet at a line card, generating a control packet for each of at least one other line card to enable an address update operation thereat, and propagating the at least one control packet toward the at least one other line card. The control packet, or packets, is generated in response to a determination to perform an address update operation for the received data packet. The address update process may be implemented as an ingress address update process or an egress address update process. This address update process performed in conjunction with an address aging process.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION OF THE INVENTION

The present invention overcomes the limitations of implementing MAC address learning in the control plane (centralized MAC address learning in the slow path) by implementing efficient distributed MAC address learning in the forwarding plane (distributed MAC address learning in the fast path). Specifically, the portion of the forwarding database involving MAC address learning is implemented in the forwarding plane (fast path). By implementing MAC address learning entirely in the forwarding plane, the present invention eliminates the need for communication using the complex control interface between the control plane and the forwarding plane, thereby removing a bottleneck currently causing network degradation in existing Ethernet networks. As such, the present invention provides significant advantages over MAC address learning in the control plane.

As described herein, although the term "MAC address learning" is often used as a general term, MAC address learning operations may include MAC address learning operations (i.e., adding an entry to a forwarding database), MAC address refresh operations (i.e., refreshing an address timestamp of an entry of a forwarding database), and MAC address re-learning operations (refreshing an address timestamp and updating a port of an entry of a forwarding database). As such, in order to prevent confusion between general references to "MAC address learning" and the different MAC address learning operations, the typical term "MAC address learning" will be more generally referred to herein as "MAC address update" and, similarly, the typical term "MAC address learning operation" will be more generally referred to herein as "MAC address update operation" (or "forwarding database update operation").

Figure 1:
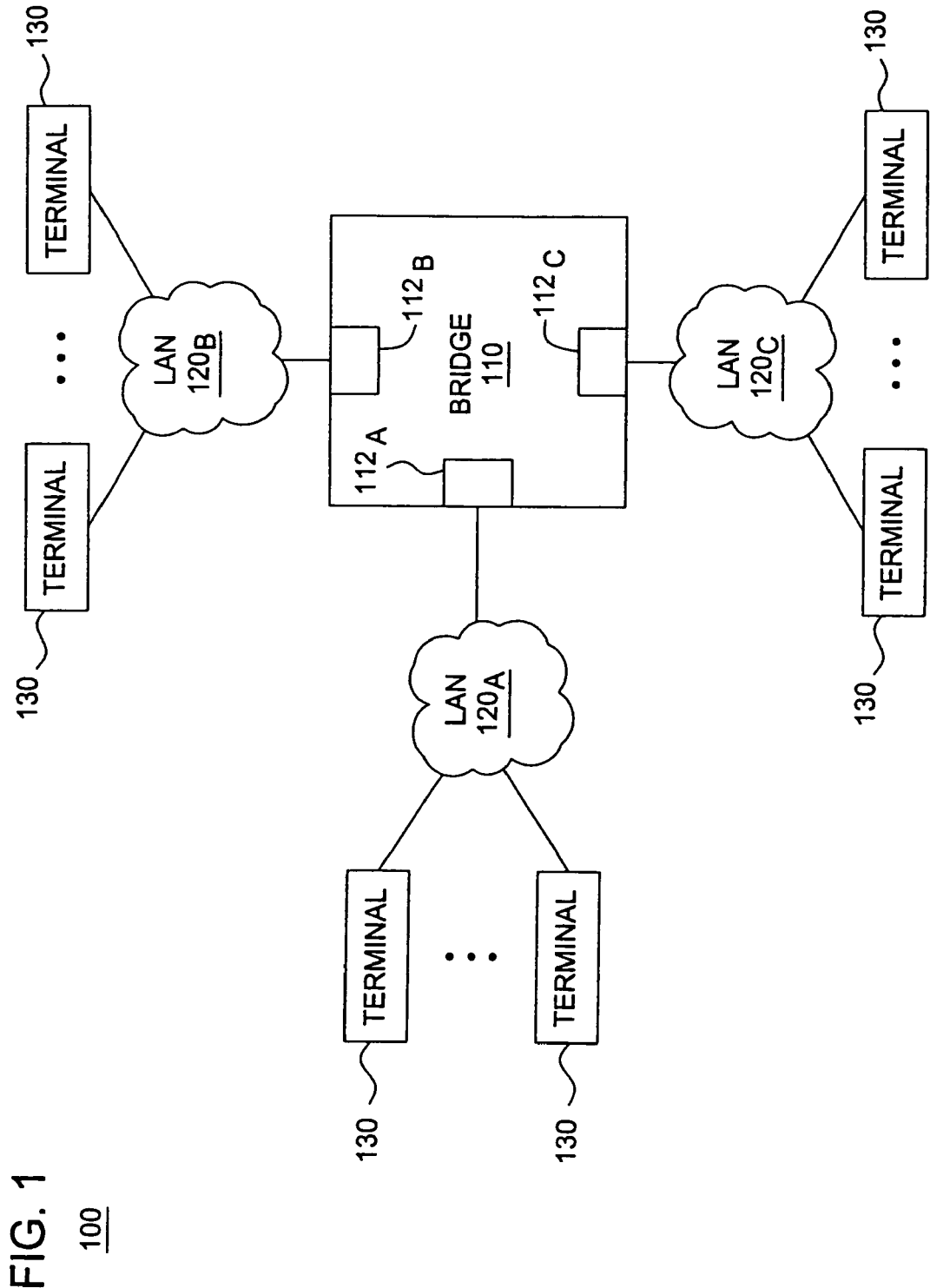
FIG. 1 depicts a high-level block diagram of a communication network.

FIG. 1 depicts a high-level block diagram of a communication network. The communication network 100 includes a bridge 110 interconnecting a plurality of local area networks (LANs) $120_A$-$120_C$ (collectively, LANs 120), each LAN 120 supporting a plurality of terminals 130 (collectively, terminals 130). In one embodiment, bridge 110 and LANs 120 may be Ethernet-based, although the present invention is not limited to such an implementation (i.e., various other bridging technologies may be used). The bridge 110 includes a plurality of line cards $112_A$-$112_C$ (collectively, line cards 112) serving LANs $120_1$-$120_3$, respectively. The line cards 112 of bridge 110 exchange data packets for propagating data packets between LANs 120. The line cards 112 of bridge 110 exchange MAC address update information for synchronizing distributed forwarding databases maintained by line cards 112.

Figure 2:
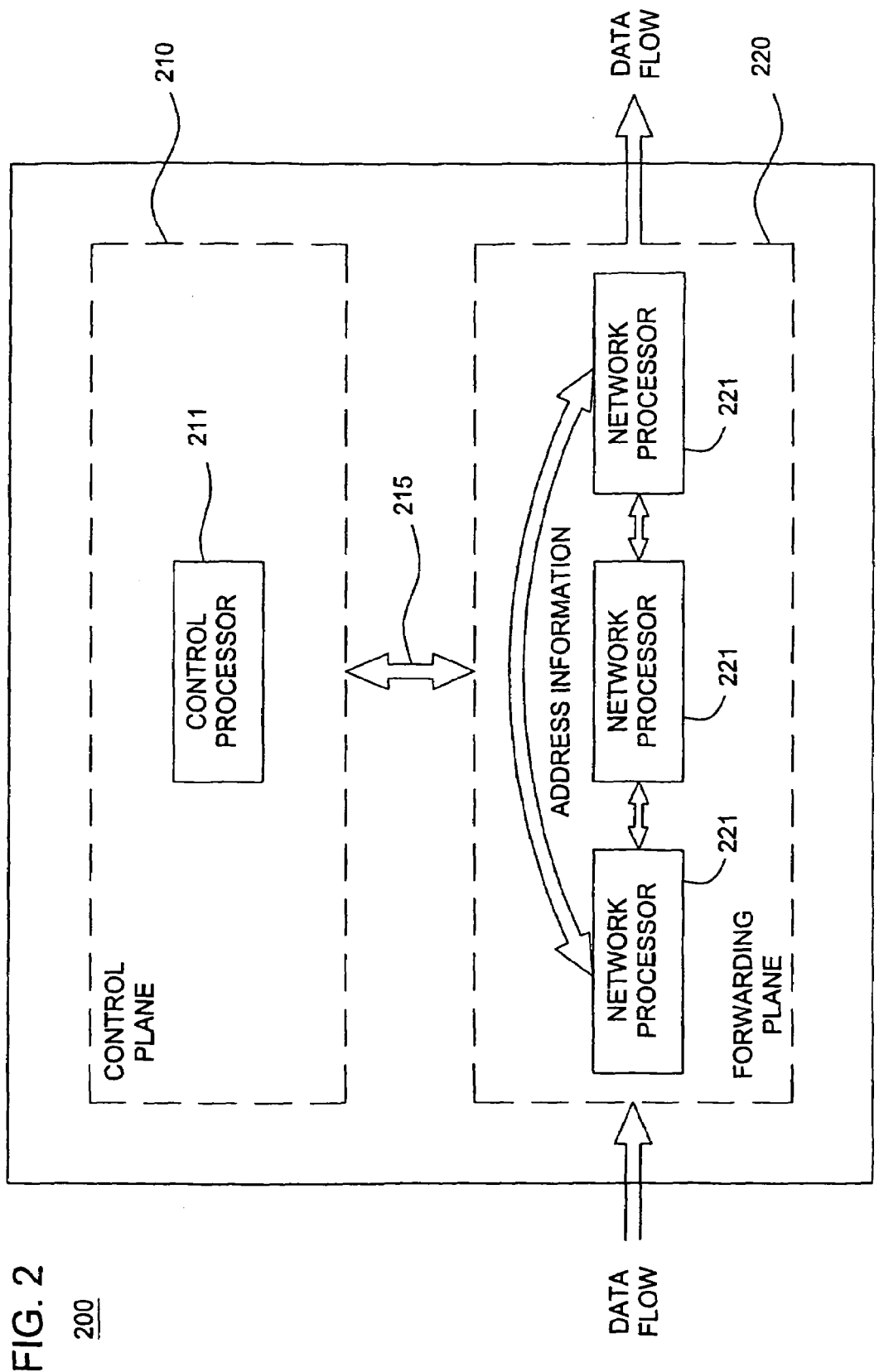
FIG. 2 depicts a high-level block diagram of the bridge of FIG. 1.

FIG. 2 depicts a high-level block diagram of the bridge of FIG. 1. The bridge 100 includes a control plane 210 and a forwarding plane 220. The control plane 210 and forwarding plane 220 communicate using a control channel 215. The control plane 210 includes a control module 211 providing control functions for forwarding plane 220. The forwarding plane 220 includes forwarding module(s) 221 (e.g., line cards 112 and associated modules). The forwarding plane 220 forwards data packets and, further, in accordance with the present invention, performs distributed MAC address learning (as opposed to existing bridges, in which control plane 210 would perform centralized MAC address learning using control channel 215). The distributed MAC address learning functions of the present invention may be better understood with respect to FIG. 3-FIG. 13 depicted and described herein.

As depicted in FIG. 2, bridge 100 utilizes enhanced hardware and software in support of distributed MAC address update functions of the present invention. The control module 211 may include one or more control plane hardware chips (e.g., control processors, memory, and the like) and associated software. The forwarding plane modules 220 may each include one or more forwarding plane hardware chips (e.g. network processors, memory, and the like) and associated software. The control plane hardware chips control the forwarding plane hardware chips. The forwarding plane hardware chips support data packet forwarding functions and distributed MAC address update functions. In other words, in accordance with the present invention, MAC address updates (i.e., MAC address learning) are performed entirely within forwarding plane 220, thereby eliminating communication between control plane 210 and forwarding plane 220 (i.e., slow path communications) for purposes of MAC address updates.

The forwarding plane hardware chips comprise forwarding plane hardware chips enhanced in accordance with the present invention. The forwarding plane hardware chips are enhanced to support distributed synchronization of MAC addresses across line cards. In one embodiment, enhanced forwarding plane hardware chips include enhanced Ethernet chips. Specifically, in one embodiment, Ethernet chips are enhanced to include a control packet replicator engine and a MAC address aging engine. In another embodiment, in which Ethernet chips include multicast replicator engines and MAC address aging engines, the multicast replicator engines and MAC address aging engines may be enhanced in support of the distributed MAC address update functions of the present invention, as depicted and described herein.

Although primarily depicted and described herein with respect to a specific implementation of bridge 110 (including specific implementations of control plane 210 and forwarding plane 220), various other control plane and forwarding plane implementations may be utilized to provide distributed MAC address update functions of the present invention. Specifically, distributed MAC address update functions of the present invention may be implemented using various combinations of hardware and/or software. The description of the present invention within the context of specific hardware and/or software implementations is for illustrative purposes only. The present invention is not intended to be limited to specific hardware and/or software implementations depicted and described herein for purposes of describing the distributed MAC address update functions of the present invention.

Figure 3:
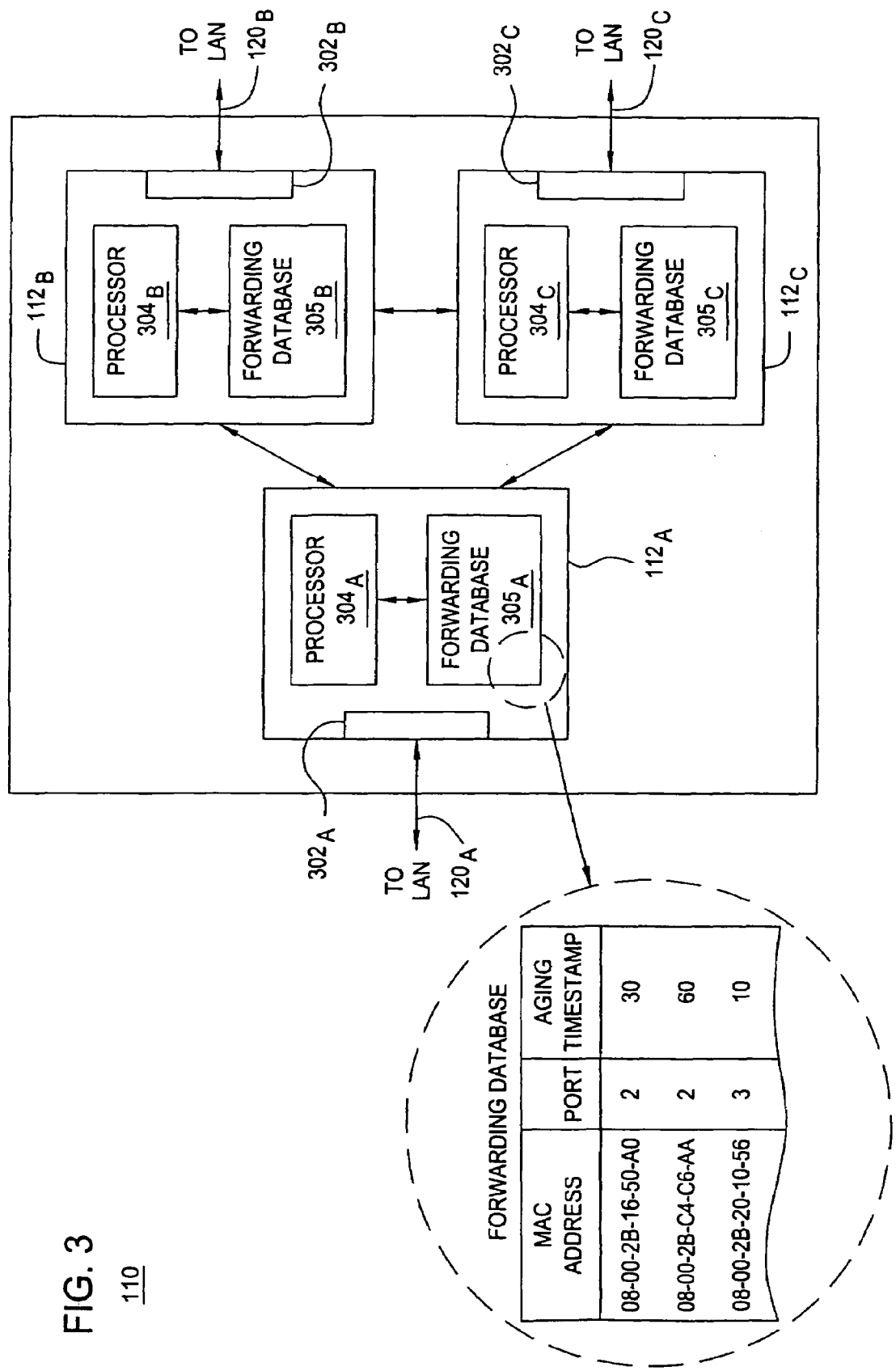
FIG. 3 depicts a high-level block diagram of the bridge of FIG. 1.

FIG. 3 depicts a high-level block diagram of the bridge of FIG. 1. As depicted in FIG. 3, bridge 110 includes a plurality of line cards $112_A$-$112_C$ (collectively, line cards 122). The line cards $112_A$-$112_C$ include respective ports $302_A$-$302_C$ (collectively, ports 302). The ports 302 receive data packets from other bridges or terminals (not depicted) and transmit data packets to other bridges or terminals (not depicted). The line cards $112_A$-$112_C$ include respective processors $304_A$-$304_C$ (collectively, processors 304). The line cards $112_A$-$112_C$ include respective forwarding databases $305_A$-$305_C$ (collectively, forwarding databases 305). The line cards 112 (specifically, processors 304 and forwarding databases 305) support data packet forwarding functions and MAC address update functions of the present invention, which may be better understood with respect to FIG. 4-FIG. 13.

As depicted in FIG. 3, each line card 112 supports data packet forwarding functions. A line card 112 on which a data packet is received determines the forwarding of the received data packet. A port 302 receives a data packet (operating as an ingress port for the received data packet). The processor 304 associated with ingress port 302 determines one or more other ports 302 to which to forward the received data packet (operating as an egress port(s) for the data packet). The processor 304 determines which egress port(s) 302 to which to forward the received data packet using associated forwarding database 305 (of the line card of the ingress port 302). Specifically, processor 304 determines a destination MAC address of the received data packet and searches the associated forwarding database 305 for the destination MAC address.

As depicted in FIG. 3, each line card 112 supports MAC address update functions. A line card 112 associated with a data packet forwarded over bridge 110 (i.e., an ingress line card 112 on which a data packet is received or an egress line card 112 from which a data packet is transmitted) determines whether to distribute MAC address update information for the data packet. The processor 304 associated with that line card 112 determines whether to distribute MAC address update information for the received data packet using associated forwarding database 305. The processor 304, if MAC address update information is to be distributed, distributes associated MAC address update information to other ones of the line cards 112. Specifically, processor 304 generates control packets (denoted herein as Learning Request Packets (LRPs)) including MAC address learning information and distributes the control packets to other ones of the line cards 112.

As depicted in FIG. 3, a forwarding database 305 includes a plurality of MAC address entries (depicted as rows in the forwarding database). The forwarding database 305 includes fields (depicted as columns in the forwarding database) storing information for each of the MAC address entries. In one embodiment, each forwarding database includes a MAC ADDRESS field, a PORT field (identifying the port serving the associated MAC address), and an ADDRESS AGING TIMESTAMP field (indicative of the age of the associated MAC address). As described herein, aging timestamp values stored in the ADDRESS AGING TIMESTAMP field may be updated by respective aging timers (which may count down or up, depending on the implementation). Although omitted for purposes of clarity, one or more of forwarding databases 305 may include one or more additional fields for providing additional information for each MAC address entry.

As described herein, line cards 112 exchange data packets and MAC address update information. The line cards 112 communicate using communication paths (CPs) 308 (collectively, CPs 308) for exchanging data packets and MAC address update information. Specifically, as depicted in FIG. 3, line cards 112$_A$ and 112$_B$ communicate using CP 308$_1$, line cards 112$_B$ and 112$_C$ communicate using CP 308$_2$, and line cards 112$_C$ and 112$_A$ communicate using CP 308$_3$. The CPs 308 may be implemented using any means of communication between line cards 112 (e.g., using one or more of switching card(s), a backplane, and the like, as well as various combinations thereof). The present invention is not limited to any specific implementation of inter-card communications.

Although primarily depicted and described herein as including a port, a processor and a forwarding database, each line card 302 may include various other components for providing functions of the present invention (e.g., processors, memory, support circuits, and the like, as well as various combinations thereof). Although depicted and described, for purposes of clarity, with respect to line cards having only one port, line cards may include multiple ports. Although depicted and described, for purposes of clarity, with respect to three line cards, bridge 110 may include fewer or more line cards.

As depicted and described herein, line cards 112 exchange data packets and MAC address update information. The line cards 112 perform data packet forwarding functions (for unicast traffic and/or multicast traffic) using respective forwarding databases 305. The line cards 112 perform MAC address update functions (including performing MAC address update operations, distributing MAC address update information, performing MAC address aging processing, and the like, as well as various combinations thereof) using respective forwarding databases 305. The line cards 112 distribute MAC address update information using control packets (denoted herein as Learning Request Packets (LRPs)). The performance of MAC address update operations and distribution of associated MAC address update information is depicted and described herein with respect to FIG. 6-FIG. 8. The performance of MAC address aging processing is depicted and described herein with respect to FIG. 9-FIG. 10.

Figure 4:
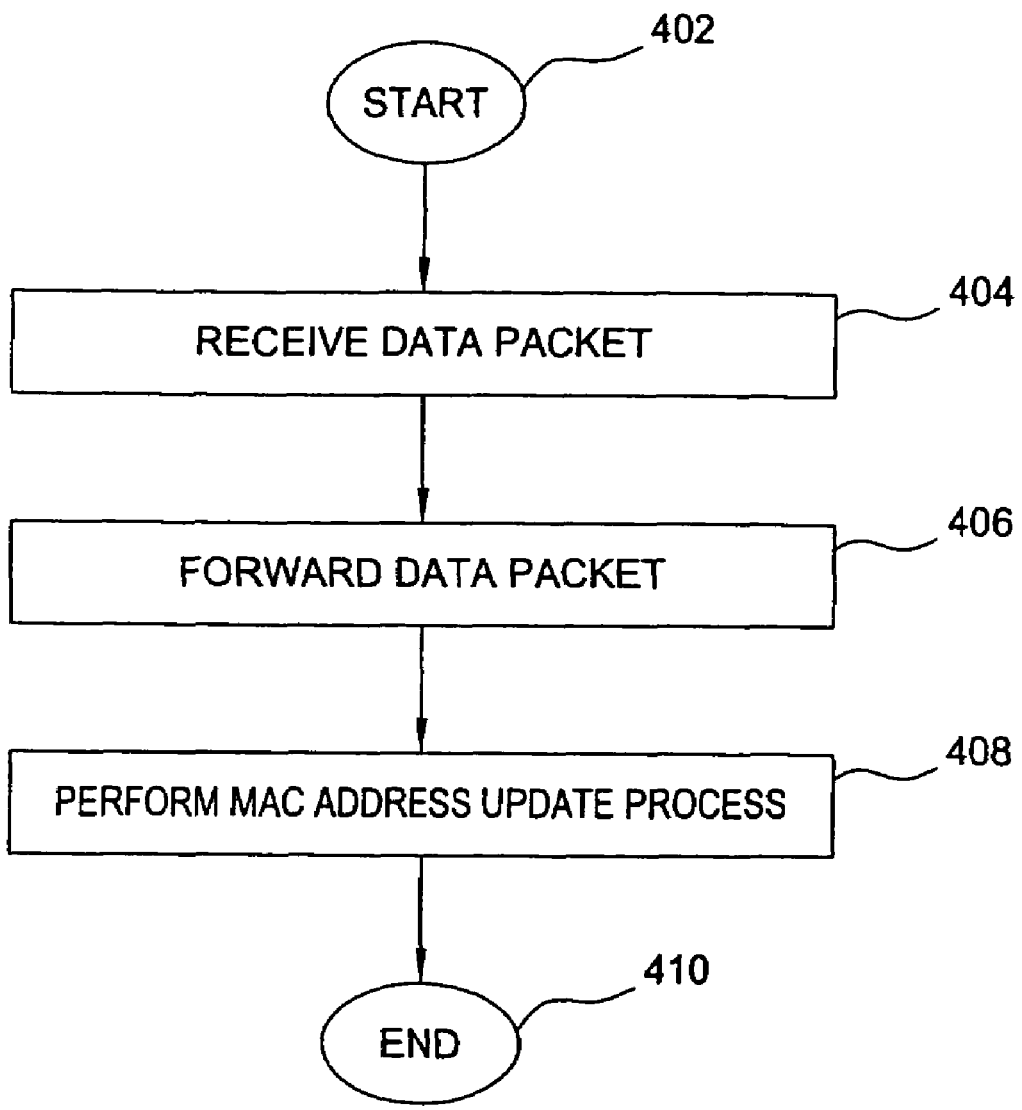
FIG. 4 depicts a method according to one embodiment of the present invention.

FIG. 4 depicts a method according to one embodiment of the present invention. Specifically, method 400 of FIG. 4 includes a method for processing a received data packet, including forwarding the received data packet and performing MAC address update functions for the received data packet. Although depicted and described with respect to one data packet, method 400 is performed for each data packet received at a bridge on which method 400 operates. Although depicted and described as being performed serially, at least a portion of the steps of method 400 of FIG. 4 may be performed contemporaneously, or in a different order than depicted and described herein with respect to FIG. 4. The method 400 begins at step 402 and proceeds to step 404.

At step 404, a data packet is received. The data packet is received at an ingress port. The data packet includes a data packet header and a data packet payload. The format of the data packet depends on the underlying technology. In one embodiment, for example, the data packet may be an Ethernet packet. In this embodiment, the data packet header may include, among other data packet header fields, a source MAC address field identifying a terminal from which the packet originates and a destination MAC address field identifying a terminal (or terminals) for which the data packet is intended. Although primarily depicted and described herein with respect to Ethernet data packets, the present invention may be used for providing enhanced MAC address update functions for networks exchanging various other types of data packets.

At step 406, the data packet is forwarded. The data packet is forwarded to one or more line cards. The data packet is forwarded for transmission over one or more egress ports (which may be disposed on the one or more line cards). The forwarding of the data packet is depicted and described herein with respect to FIG. 5. At step 408, a MAC address update process is performed. The MAC address update process is performed for the received data packet. The MAC address update process may be performed on the ingress line card (for ingress MAC address updates) or, alternatively, on one of the other line cards (for egress MAC address updates). The performance of MAC address update process is depicted and described herein with respect to FIG. 6-FIG. 10. At step 410, method 400 ends.

Figure 5:
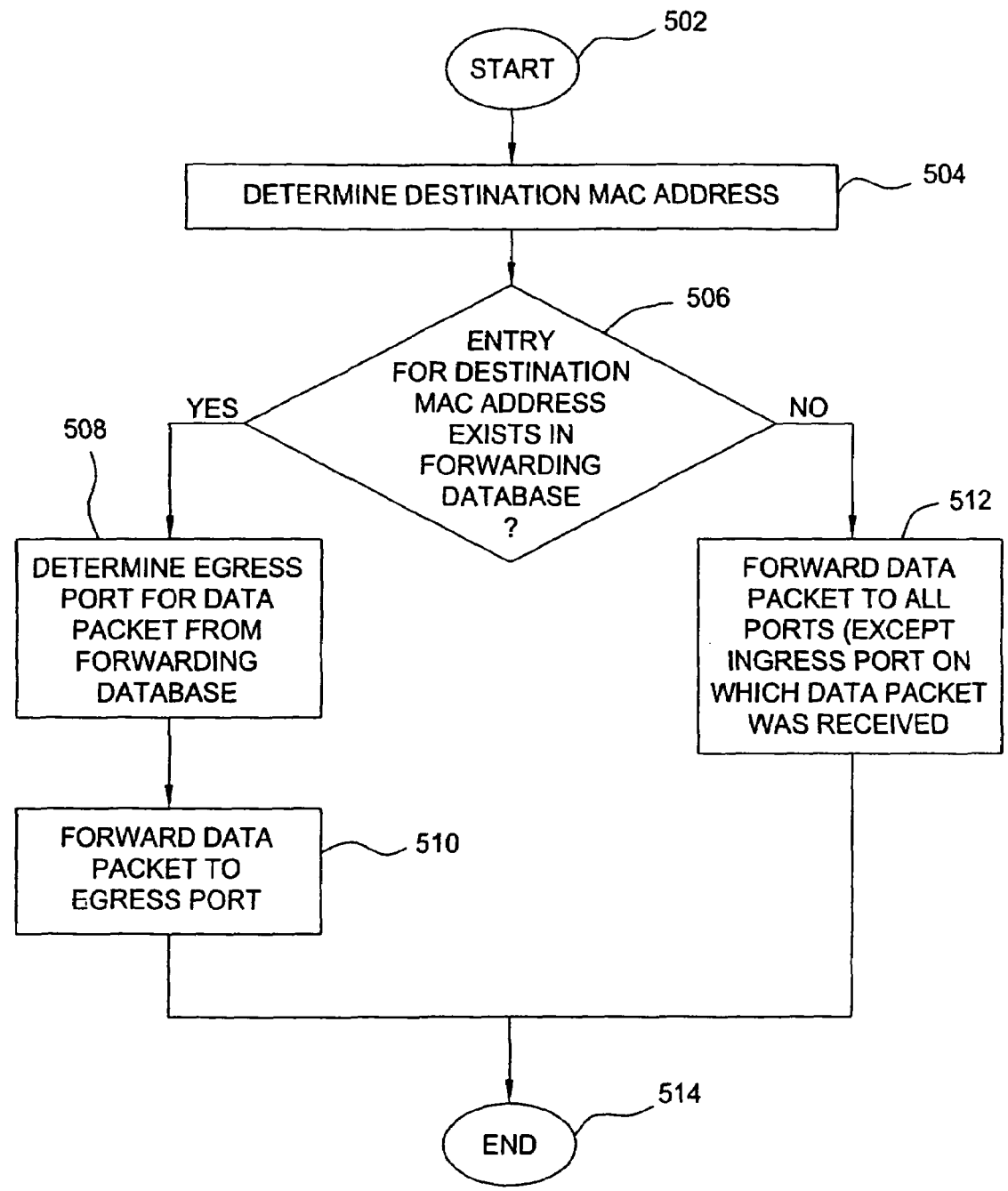
FIG. 5 depicts a method according to one embodiment of the present invention.

FIG. 5 depicts a method according to one embodiment of the present invention. Specifically, method 500 of FIG. 5 includes a method for forwarding a received data packet. Although depicted and described as being performed serially, at least a portion of the steps of method 500 of FIG. 5 may be performed contemporaneously, or in a different order than depicted and described herein with respect to FIG. 5. The method 500 begins at step 502 (after a data packet has been received, as depicted and described with respect to method 400 of FIG. 4) and proceeds to step 504.

At step 504, the destination MAC address of the data packet is determined (e.g., from the header of the data packet). At step 506, a determination is made as to whether an entry for the destination MAC address exists in the forwarding database (i.e., the forwarding database of the line card for the ingress port). The determination as to whether an entry for the destination MAC address exists in the forwarding database is performed by searching the forwarding database for the destination MAC address (i.e., for an forwarding database entry including the destination MAC address). If an entry for the destination MAC address is included in the forwarding database, method 500 proceeds to step 508. If an entry for the destination MAC address is not included in the forwarding database, method 500 proceeds to step 512.

At step 508, an egress port for the data packet (i.e., the port from which the data packet exits the bridge) is determined. The egress port for the data packet is determined using the forwarding database (e.g., from the PORT value associated with the entry of the forwarding database that includes the destination MAC address). At step 510, the data packet is forwarded to the egress port for the data packet (which may be a different port on the same line card as the ingress port, a port on a different line card, or more than one port on one or more line cards (for multicast)). From step 510, method 500 proceeds to step 514, where method 500 ends. At step 512, the data packet is forwarded to all ports (i.e., all other ports on the bridge except for port X, including other ports on same line card as the ingress port, as well as other line cards of the bridge). From step 512, method 500 proceeds to step 514, where method 500 ends.

Figure 6:
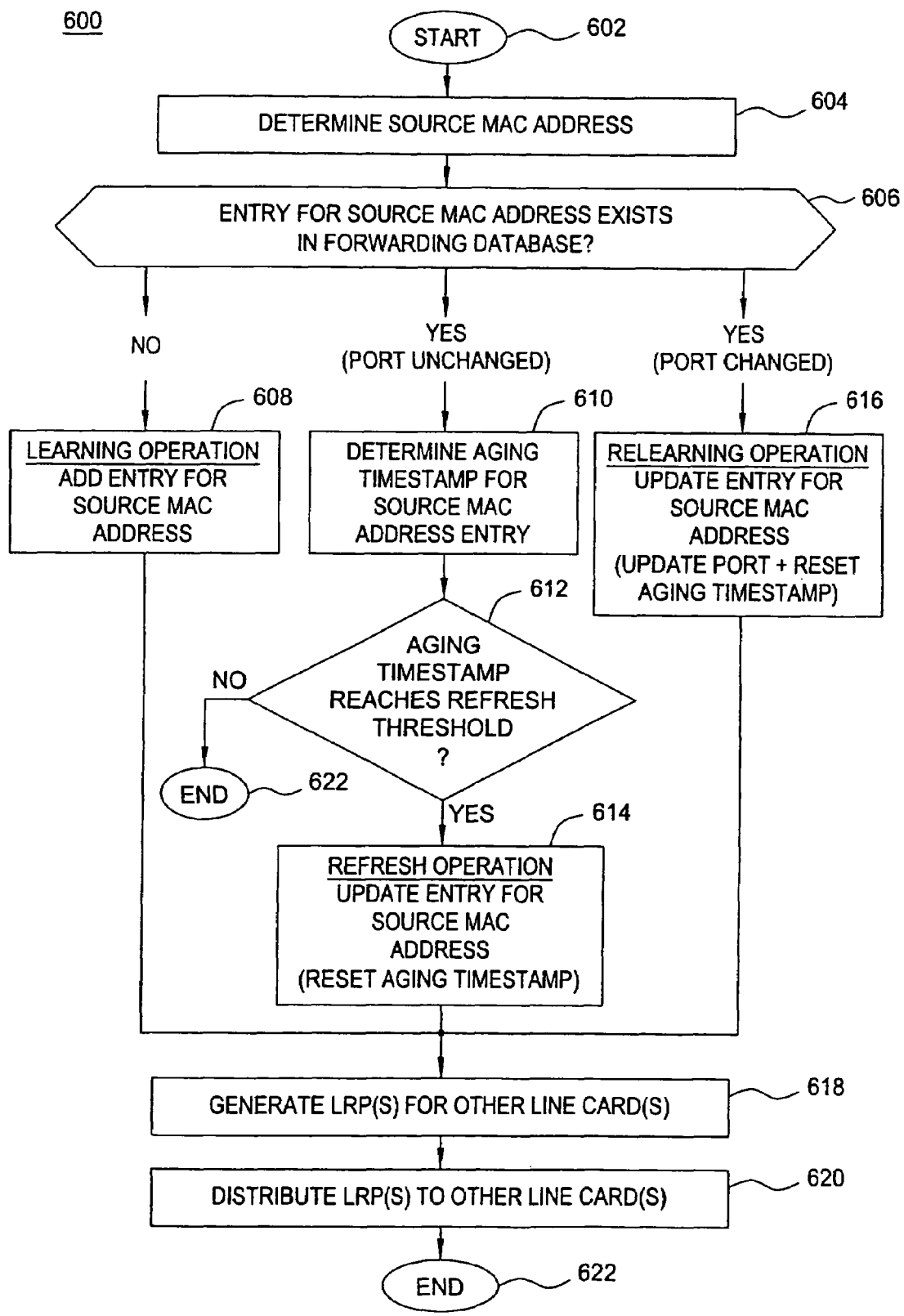
FIG. 6 depicts a method according to one embodiment of the present invention.

FIG. 6 depicts a method according to one embodiment of the present invention. Specifically, method 600 of FIG. 6 includes a method for performing MAC address updates for a received data packet on one line card and distributing associated MAC address update information to at least one other line card. Although depicted and described as a standalone method, method 600 of FIG. 6 is performed in conjunction with method 900 of FIG. 9 in order to provide MAC address update functions of the present invention. Although depicted and described as being performed serially, at least a portion of the steps of method 600 of FIG. 6 may be performed contemporaneously, or in a different order than depicted and described herein with respect to FIG. 6. The method 600 begins at step 602 (after a data packet has been received, as depicted and described with respect to method 400 of FIG. 4) and proceeds to step 604.

At step 604, the source MAC address of the received data packet is determined (e.g., from the header of the received data packet). At step 606, a determination is made as to the type of MAC address update operation that may be performed for the received data packet. As depicted in FIG. 6, the determining the type of MAC address update operation that may be required for the received data packet depends: (1) on a determination as to whether an entry for the source MAC address exists in the forwarding database, and (2) if an entry for the source MAC address does exist in the forwarding database, on a determination as to whether the associated port of the existing entry is unchanged or changed (as compared with the port address currently associated with that MAC address, as determined from the received data packet). The MAC address update operation may be a MAC address learning operation, a MAC address refresh operation, or a MAC address re-learning operation, each of which is described in additional detail herein.

As depicted in FIG. 6, the determination as to whether an entry for the source MAC address exists in the forwarding database is performed by searching the forwarding database for the source MAC address (i.e., for a forwarding database entry including the source MAC address). For ingress MAC address updating, the forwarding database of the ingress line card is searched to determine the type of MAC address update operation. For egress MAC address updates, the forwarding database of the egress line card is searched to determine the type of MAC address update operation. The determination as to whether the associated port of an existing entry is unchanged or changed includes a determination as to whether the ingress port on which the existing data packet is received matches the PORT value of the corresponding entry in the forwarding database.

As depicted in FIG. 6, one of the types of MAC address update operations is identified and may be performed (i.e., learning and re-learning operations are performed; however, refresh operations may or may not be performed). If an entry for the source MAC address does not exist in the forwarding database, a learning operation is performed (as specified in step 608). If an entry for the source MAC address does exist in the forwarding database, and the associated port of the existing entry is unchanged, a refresh operation may or may not be performed (as specified in steps 610, 612, and 614). If an entry for the source MAC address does exist in the forwarding database, and the associated port of the existing entry has changed, a re-learning operation is performed (as specified in step 616). For each type of MAC address learning operation, an LRP is generated for other line cards (as specified in step 618) and distributed to other line cards (as specified in step 620).

At step 608, a learning operation is performed. The learning operation is performed on the current line card on which the forwarding database is maintained. The learning operation comprises learning the source MAC address. Specifically, the learning operation comprises adding an entry to the forwarding database for the source MAC address. In one embodiment, the source MAC address entry includes the source MAC address, the egress port associated with the source MAC address (i.e., the port on which the associated data packet was received), and an associated aging timestamp. In one embodiment, the aging timestamp is initiated to a minimum value and incremented (e.g., from 0 seconds toward 600 seconds). In one embodiment, the aging timestamp is initiated to a maximum value and decremented (e.g., from 600 seconds toward 0 seconds).

At steps 610, 612 and 614, a refresh operation may or may not be performed. At step 610, the aging timestamp for the source MAC address is determined. In one embodiment, the aging timestamp for the source MAC address is retrieved from the existing source MAC address entry in the forwarding database. At step 612, a determination is made as to whether the aging timestamp reaches (or satisfies) a threshold. The threshold is denoted herein as a refresh threshold since this threshold is used in order to determine whether or not a MAC address refresh operation should be performed.

If the aging timestamp does not reach the refresh threshold (which means that the aging timestamp is less than the refresh threshold if the aging timestamp counts up, or that the aging timestamp is greater than the refresh threshold if the aging timestamp counts down), method 600 proceeds to step 622, where method 600 ends (i.e., an LRP is not generated for that data packet). If the aging timestamp reaches the refresh threshold (which means that the aging timestamp is greater than the refresh threshold if the aging timestamp counts up, or that the aging timestamp is less than the refresh threshold if the aging timestamp counts down), method 600 proceeds to step 614 (where a refresh operation is performed).

At step 614, a refresh operation is performed. The refresh operation is performed on the current line card on which the forwarding database is maintained. The refresh operation comprises refreshing the source MAC address entry. Specifically, the refresh operation comprises updating the source MAC address entry in the forwarding database (i.e., resetting the aging timestamp in the AGING TIMESTAMP field for that source MAC address entry of the forwarding database). In one embodiment, the aging timestamp is refreshed to a minimum value and incremented (e.g., from 0 seconds toward 600 seconds). In one embodiment, the aging timestamp is refreshed to a maximum value and decremented (e.g., from 600 seconds toward 0 seconds).

At step 616, a relearning operation is performed. The relearning operation is performed on the current line card on which the forwarding database is maintained. The relearning operation comprises relearning the source MAC address. Specifically, the relearning operation comprises updating the source MAC address entry in the forwarding database (i.e., updating the PORT field to include the new port associated with that source MAC address and resetting the aging timestamp in the AGING TIMESTAMP field for that source MAC address). In one embodiment, the aging timestamp is refreshed to a minimum value and incremented (e.g., from 0 seconds toward 600 seconds). In one embodiment, the aging timestamp is refreshed to a maximum value and decremented (e.g., from 600 seconds toward 0 seconds).

At step 618, LRPs are generated for other line cards, respectively. In one embodiment, LRPs are not generated for the line card on which the associated data packet is received or the line card(s) from which the associated data packet is transmitted because that line card or line cards can perform the appropriate MAC address update operation using the data packet (i.e., generation of an additional LRP or LRPs for a line card or line cards over which the associated data packet passes is not required). In another embodiment, an LRP is generated for each of the other line cards and the generated LRPs are distributed to each of the other line cards (although in such an embodiment, additional processing may be required to prevent a line card which receives a data packet and an LRP generated from that data packet from performing multiple MAC address operations for the same data packet).

The LRPs generated for the other line cards are adapted for use by the other line cards in synchronizing respective forwarding databases of the other line cards. In other words, the distributed MAC address update functions of the present invention enable synchronization of all forwarding databases on all line cards using a combination of processing of the data packet (on line cards over which the data packet passes) and generation, distribution, and processing of one or more LRPs. Although three different types of MAC address update operations may be performed (namely, a MAC address learning operation, a MAC address refresh operation, and a MAC address relearning operation), in one embodiment, the format of the generated LRP(s) is independent of the type of MAC address update operation which triggered generation of the LRP(s).

In one embodiment, each LRP is generated by replicating the associated received data packet. In one such embodiment, the received data packet is replicated using one or more multicast replication functions. In one embodiment, each LRP is generated without replicating the associated data packet. In one such embodiment, an LRP is generated to include information required by other ones of the line cards to update respective forwarding databases of the other line cards. In this embodiment, the LRP may include any information adapted for communicating MAC address update information to other ones of the line cards.

By replicating a data packet to form an associated LRP, information required by the line card receiving the LRP in order to perform a MAC address learning operation in response to receiving the LRP (e.g., source MAC address, ingress port, and the like) is guaranteed to be included within the LRP. As described herein, since LRPs are distributed in the data packet forwarding path (and because LRPs may comprise copies of associated data packets), LRPs must be distinguished from data packets. In one embodiment, LRPs may be adapted such that line cards receiving both data packets and LRPs in the data packet forwarding path can distinguish between received data packets and LRPs. The LRPs may be distinguished from the data packets in a number of different ways (some examples of which are depicted and described herein with respect to FIG. 7).

At step 620, LRPs generated for the other line cards are distributed to the other line cards. The LRPs generated from a received data packet are distributed to the other line cards in the forwarding plane (i.e. using the data packet forwarding path(s) by which data packets are forwarded between line cards). In one embodiment, multicast groups may be utilized for distributing LRPs in order to reduce unnecessary LRPs. In one embodiment, one or more dedicated queues (e.g., dedicated to certain entities such as bridge partitions, filtering identifiers, and the like) may be utilized for distributing LRPs in order to reduce the number of unnecessary LRPs. The LRPs may be distributed to the other line cards in the forwarding plane using other distribution schemes.

By generating LRPs for other line cards, and distributing the generated LRPs to the other line cards in the forwarding plane (i.e., using the data packet forwarding path), synchronization is provided for all forwarding databases of all line cards, respectively, without requiring use of a central forwarding database from which the distributed forwarding databases must be updated. In other words, the present invention provides efficient distributed MAC address updates in the forwarding plane, providing improved performance over existing MAC address update (learning) schemes.

Figure 7:
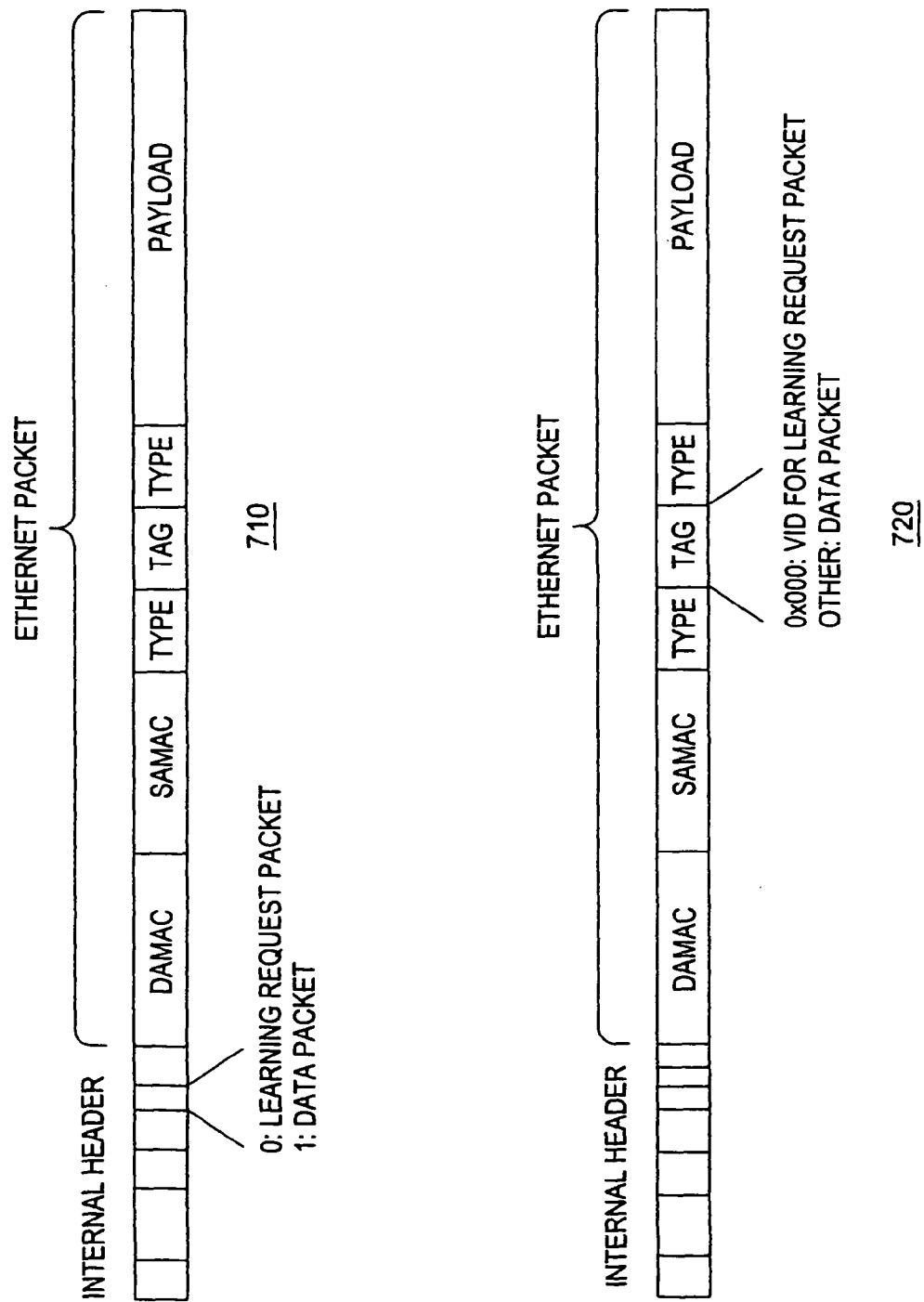
FIG. 7 depicts exemplary learning request packets (LRPs) adapted for distributing address learning information in the forwarding plane.

FIG. 7 depicts exemplary learning request packets (LRPs) adapted for distributing address update information in the forwarding plane. As described herein, in one embodiment, an LRP is generated from an associated data packet. In one such embodiment, the LRP is generated by replicating the associated data packet. As described herein, since LRPs are distributed in the data packet forwarding path (along with data packets), LRPs must be distinguished from data packets such that line cards receiving data packets and LRPs can easily distinguish between data packets and LRPs. In one embodiment, as depicted and described herein, LRPs may be distinguished from data packets by setting one or more bits in the LRPs (i.e., replicating the data packets and setting one or more bits in the replicated data packets to mark the replicated data packets as LRPs).

As depicted in FIG. 7, the data packet from which an LRP is generated is an Ethernet data packet. The Ethernet data packet includes an Ethernet packet header and an Ethernet packet payload. The Ethernet packet header includes standard fields such as destination MAC address (DAMAC), source MAC address (SAMAC), type, tag, type, and the like. The Ethernet packet payload includes data. An internal header may be pre-pended to the Ethernet data packet for use within the Ethernet switch. The internal header may be replicated from the data packet during generation of the LRP or pre-pended to the LRP generated from the data packet. The LRPs may be distinguished from the data packets in a number of different ways (illustratively, by setting information in the replicated copy of the data packet that marks the replicated data packet as an LRP).

As depicted in FIG. 7, in one embodiment, a packet (illustratively, packet 710) is indicated as being an LRP (as opposed to a data packet) by setting one or more bits in the internal header. The bits may be set in one or more fields of the internal header. For example, a bit set equal to 0 may indicate that the packet is an LRP, while a bit set equal to 1 may indicate that the packet is a data packet (or vice versa). The internal header of a packet may be marked in various other ways in order to mark the packet as an LRP. In addition to modifying a portion of the internal header, in one embodiment, one or more additional fields may be pre-pended to the internal header in order to mark the packet as an LRP.

As depicted in FIG. 7, in one embodiment, a packet (illustratively, packet 720) is indicated as being an LRP (as opposed to a data packet) by setting one or more bits in the packet header. The bits may be set in one or more fields of the packet header. In one embodiment, in which the LRP is generated from an Ethernet packet, the replicated data packet may be marked as an LRP by setting a value in the TAG field (i.e., the IEEE 802.1Q VLAN tag field) of the Ethernet packet header of the replicated packet. For example, a TAG field equal to 0x000 may indicate that the packet is an LRP, while a TAG field equal to any other value may indicate that the packet is a data packet. Although depicted as including the Ethernet packet payload, in one embodiment, the Ethernet packet payload may be stripped from the LRP (either during or after replication of the data packet). The packet header of a packet may be marked in various other ways in order to mark the packet as an LRP.

Although primarily depicted and described with respect to Ethernet packets, LRPs may be generated from various other types of data packets. Although primarily depicted and described with respect to data packets including internal headers, LRPs may be generated from data packets without internal headers. Although primarily depicted and described as having payloads, in one embodiment, replication of data packets to form respective LRPs may include stripping of the data packet payloads, such that the size of the resulting LRPs is reduced. Although primarily depicted and described with respect to LRPs generated by replicating associated data packets, in one embodiment control packets may be generated without replicating associated data packets.

Figure 8:
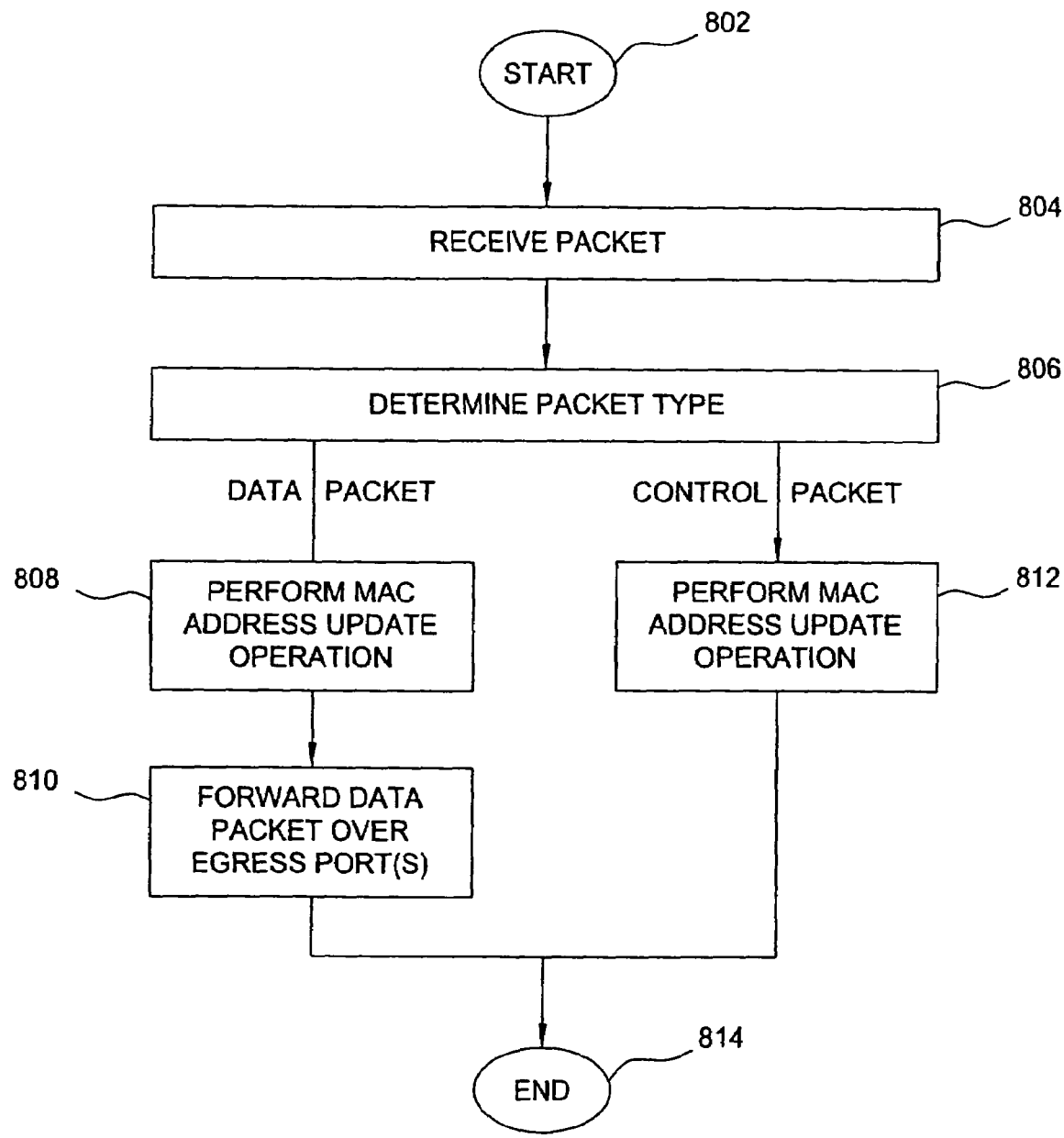
FIG. 8 depicts a method according to one embodiment of the present invention.

FIG. 8 depicts a method according to one embodiment of the present invention. Specifically, method 800 of FIG. 8 includes a method for processing packets received over the data forwarding path (i.e., including performing a MAC address update operation in response to a data packet and forwarding the data packet over an egress port(s), as well as performing a MAC address update operation in response to a learning request packet without forwarding the learning request packet over an egress port). Although depicted and described with respect to one of the other line cards, method 800 is performed on each of the other line cards since each of the line cards may receive both data packets and learning request packets from other line cards over the data forwarding path. Although depicted and described as being performed serially, at least a portion of the steps of method 800 of FIG. 8 may be performed contemporaneously, or in a different order than depicted and described herein with respect to FIG. 8. The method 800 begins at step 802 and proceeds to step 804.

At step 804, a packet is received. The packet is received at a line card over an internal communication path (i.e., not a data packet received at an external port of the line card). At step 806, a packet type of the received packet is determined. The received packet may be a data packet or a control packet (e.g., an LRP). In one embodiment, the packet type of the received packet may be determined by checking one or more bits of the received packet (e.g., one or more bits of an internal header of the packet, one or more bits of the packet header of the packet, and the like, as depicted and described herein with respect to FIG. 7).

If the received packet is a data packet, method 800 proceeds to step 808. At step 808, a MAC address update operation is performed. The MAC address update operation is performed using information from the data packet. The MAC address update operation may be performed using method 600 of FIG. 6. At step 810, the data packet is forwarded over an egress port of the line card. The data packet forwarding operation may be performed using relevant portions of method 500 of FIG. 5. If the received packet is a control packet, method 800 proceeds to step 810. At step 812, a MAC address update operation is performed. The MAC address update operation is performed using information from the control packet. The MAC address update operation may be performed using relevant portions of method 600 of FIG. 6. At step 814, method 800 ends.

As described herein, where the packet is a control packet, the line card from which the control packet is received has generated a control packet for other ones of the line cards and distributed the generated packets to the other ones of the line cards, respectively. As the control packets are received at the other line cards, method 800 of FIG. 8 is repeated on the other line cards, respectively. Since each of the forwarding databases of the respective line cards (including the line card originating the LRP(s) and the line card(s) receiving the LRP(s)) should be synchronized, each of the other line cards should perform MAC address update operations identical to the MAC address update operation performed on the originating line card that generated and distributed the LRP(s)).

As described herein, MAC address aging is performed in support of MAC address update functions. The MAC address aging functions depicted and described herein are performed for each MAC address entry in a forwarding database of a line card, for each line card in the bridge. The MAC address aging functions for a given line card may be performed and/or controlled by a controller associated with that line card (illustratively, processors $304_A$-$304_C$ of line cards $112_A$-$112_C$, respectively, of bridge 110, as depicted and described herein with respect to FIG. 1 and FIG. 3). An exemplary implementation of a MAC address aging module is depicted and described herein with respect to FIG. 9. An exemplary MAC address aging process (for one MAC address entry of one forwarding database on one line card) is depicted and described herein with respect to FIG. 10.

Figure 9:
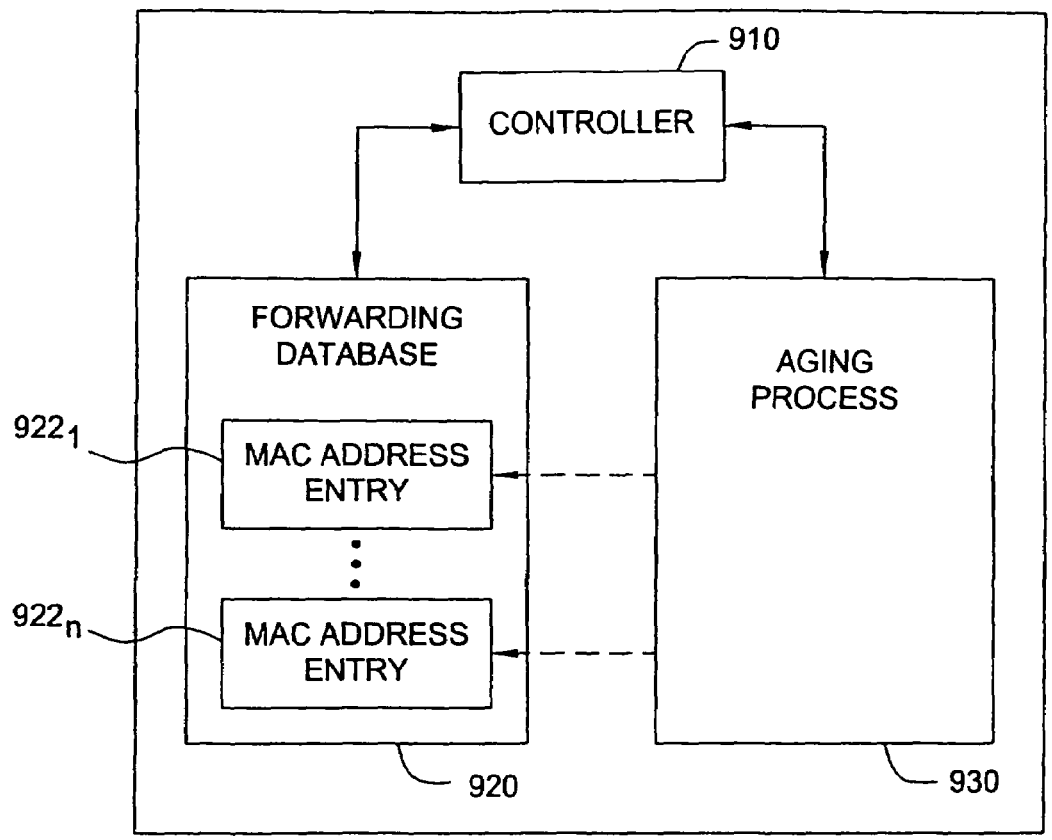
FIG. 9 depicts a high-level block diagram of a portion of a line card for MAC address aging.

FIG. 9 depicts a high-level block diagram of a portion of a line card for MAC address aging. Specifically, line card 900 may be implemented for each of the line cards of the bridge (illustratively, line cards $112_A$-$112_C$ of bridge 110, as depicted and described herein). As depicted in FIG. 9, line card 900 includes a controller 910, a forwarding database 920, and a MAC address aging process 930. The forwarding database 920 includes a plurality of MAC address entries $922_1$-$922_N$ (collectively, MAC address entries 922), which may be similar to MAC address entries depicted and described with respect to FIG. 3. The MAC address aging process 930 providing MAC address aging functions for MAC address entries $922_1$-$922_N$, respectively (denoted by dotted lines between MAC address process 930 and MAC address entries 922).

Although depicted and described herein with respect to a specific implementation for providing the enhanced MAC address aging functions of the present invention, the enhanced MAC address aging functions of the present invention may be implemented using various other implementations (e.g., using one or more other components, e.g., control modules, memory, and the like, as well as various combinations thereof). Since the enhanced MAC address aging functions of the present invention may be provided using various implementations, the operation of MAC address aging module 900 is described generally without specific reference to the components of MAC address aging module 900.

In MAC address aging, a MAC address aging timestamp is maintained for each MAC address entry of the forwarding database. The MAC address aging timestamp for a MAC address entry is periodically updated in that MAC address entry of the forwarding database. The MAC address aging timestamp for a MAC address is incremented (or decremented) periodically. The MAC address aging timestamp for a MAC address is incremented by MAC address aging process 930, which determines whether or not to age out the MAC address entry (as described herein below). The MAC address aging timestamp for a MAC address entry has an associated resolution (denoted herein as $resolution_{timestamp}$), which is the amount by which MAC address aging timestamp is incremented (e.g., by 10 seconds, by 20 seconds, and the like).

In MAC address aging, a MAC address aging process is performed for each MAC address entry of the forwarding database. The MAC address aging process for a MAC address entry is performed periodically. The MAC address aging process for a MAC address entry periodically determines whether the associated MAC address entry should be invalidated. The MAC address aging process for a MAC address entry has an associated resolution (denoted as $resolution_{process}$), which is the frequency with which the MAC address aging process is performed (and, as long as the MAC address entry is not invalidated, also the frequency with which the MAC address aging timestamp is updated for that MAC address entry).

The MAC address aging process determines whether the associated MAC address entry is invalidated (i.e., aged out) by comparing the MAC address aging timestamp of the MAC address entry to an aging threshold (denoted as $threshold_{aging}$). If the MAC address aging timestamp of the MAC address entry reaches the aging threshold (e.g., is greater than the aging threshold if the aging timestamp counts up, or is less than the aging threshold if the aging timestamp counts down), the MAC address entry is invalidated (i.e., the MAC address entry is removed from the forwarding database). If the MAC address aging timestamp of the MAC address entry does not reach the aging threshold (e.g., is less than the aging threshold if the aging timestamp counts up, or is greater than the aging threshold if the aging timestamp counts down), the MAC address entry is not invalidated; rather, the MAC address aging timestamp of that MAC address entry is updated for that MAC address entry (e.g., changing the current value of the MAC address aging timestamp to by the amount by which the MAC address aging timestamp is set to be changed).

As described herein, the present invention provides enhanced MAC address aging functions on each of the line cards. The enhanced MAC address aging functions of the present invention (including the MAC address aging process) may be better understood with respect to FIG. 10 (which depicts a method for MAC address aging). Furthermore, relationships between the MAC address aging timestamp and MAC address aging process for a MAG address entry of a forwarding database (including relationships between associated parameters $resolution_{process}$, $resolution_{timestamp}$, and $threshold_{aging}$) as well as MAC address refreshing (including associated parameter $threshold_{refresh}$), may be better understood with respect to FIG. 11 (which depicts a timing diagram for the enhanced MAC address update functions of the present invention).

Figure 10:
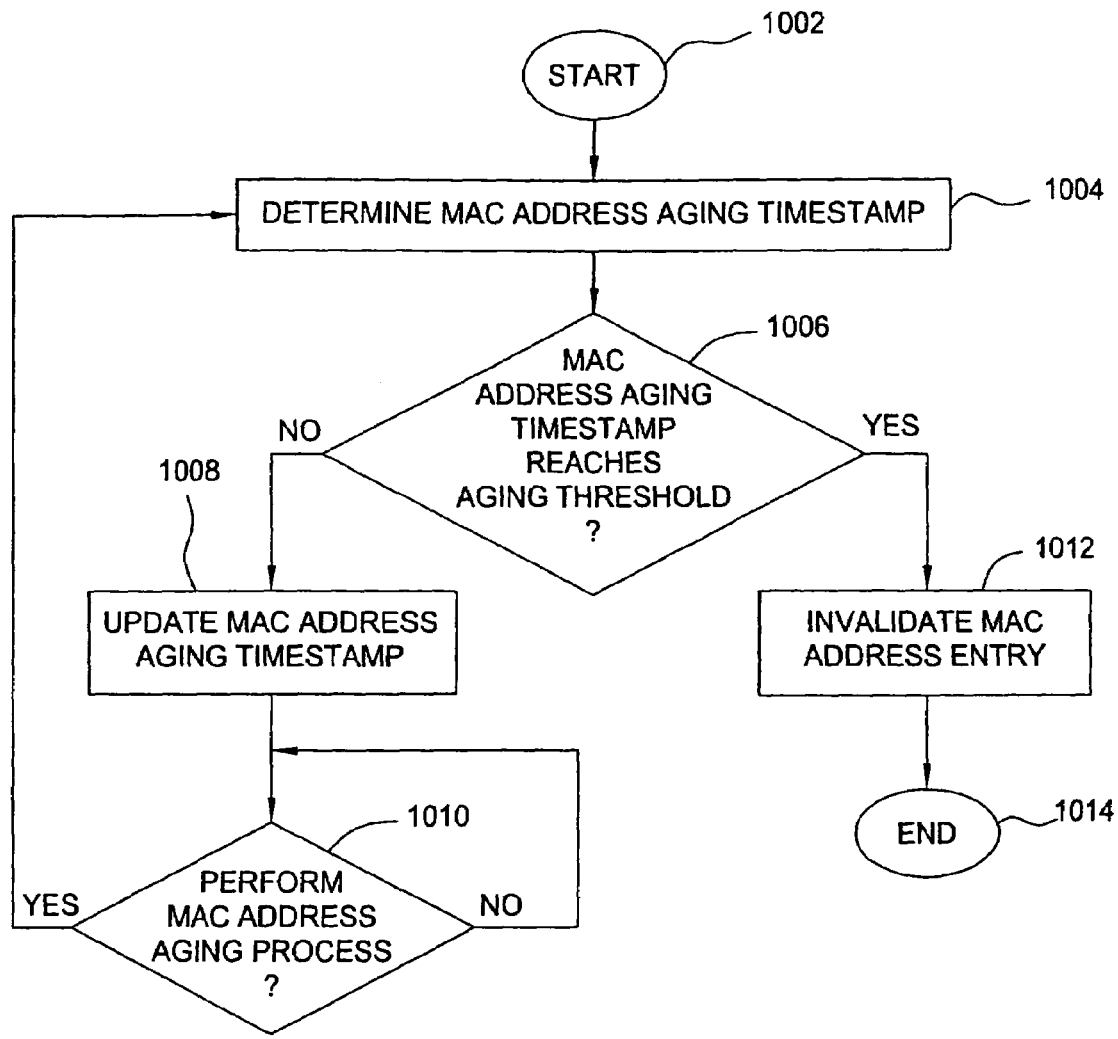
FIG. 10 depicts a method according to one embodiment of the present invention.

FIG. 10 depicts a method according to one embodiment of the present invention. Specifically, method 1000 of FIG. 10 includes a method for MAC address aging (i.e., MAC address aging process). The MAC address aging process depicted and described as method 1000 of FIG. 10 is performed for each MAC address entry of the forwarding database of each line card of a bridge. Although depicted and described as being performed serially, at least a portion of the steps of method 1000 of FIG. 10 may be performed contemporaneously, or in a different order than depicted and described herein with respect to FIG. 10. The method 1000 begins at step 1002 and proceeds to step 1004.

At step 1004, the MAC address aging timestamp is determined. The MAC address aging timestamp is determined by searching the forwarding database for the associated MAC address entry and retrieving the current value of the MAC address aging timestamp from the ADDRESS AGING TIMESTAMP field. At step 1006, a determination is made as to whether the MAC address aging timestamp is greater than an aging threshold. The aging threshold may be any value (e.g., 300 seconds, 600 seconds, and the like), and may be set depending on a number of considerations (including the resolution of the MAC address aging timestamp, i.e., $resolution_{timestamp}$, the resolution of the MAC address aging process, i.e., $resolution_{process}$, and the like, as well as various combinations thereof).

As depicted in FIG. 10, if the MAC address aging timestamp is less than the aging threshold, method 1000 proceeds to step 1008; otherwise, if the MAC address aging timestamp is greater than the aging threshold, method 100 proceeds to step 1012. At step 1008, the MAC address aging timestamp of that MAC address entry is updated. The MAC address aging timestamp of that MAC address entry is incremented or decremented depending on the implementation. For example, the MAC address aging timestamp in the forwarding database may be incremented by 10 seconds, decremented by 15 seconds, and the like. From step 1008, method 1000 proceeds to step 1010 (discussed below). At step 1012, the MAC address entry is invalidated (i.e., the MAC address entry is removed from the forwarding database). From step 1012, method 1000 proceeds to step 1014, where method 1000 ends.

At step 1010, a determination is made as to whether to perform the MAC address aging process (i.e., a determination as to whether or not it is time to perform the MAC address aging process again for that MAC address entry). Although depicted as an explicit determination, step 1010 signifies that method 1000 is performed periodically, i.e., according to the resolution of the MAC address aging process. In other words, after the MAC address aging timestamp is updated by the MAC address aging process, method 1000 waits until the MAC address aging process is to be executed again, at which time method 1000 proceeds to step 1004 to repeat the MAC address aging process (e.g., waiting the 10 seconds, 15 seconds, or whatever length of time with which the MAC address aging process is set to repeat).

Although omitted for purposes of clarity, since MAC address entries may be added to a forwarding database (during a MAC address learning operation) and removed from a forwarding database (as a result of the MAC address aging process by which MAC address entries are invalidated), the following may be performed: (1) each time a MAC address entry is added to a forwarding database, an associated MAC address aging process may be instantiated by the associated controller for purposes of performing MAC address aging processing for the new MAC address entry; and (2) each time a MAC address entry is removed from the forwarding database, the associated MAC address aging process previously maintained for that MAC address entry may be un-instantiated.

Figure 11:
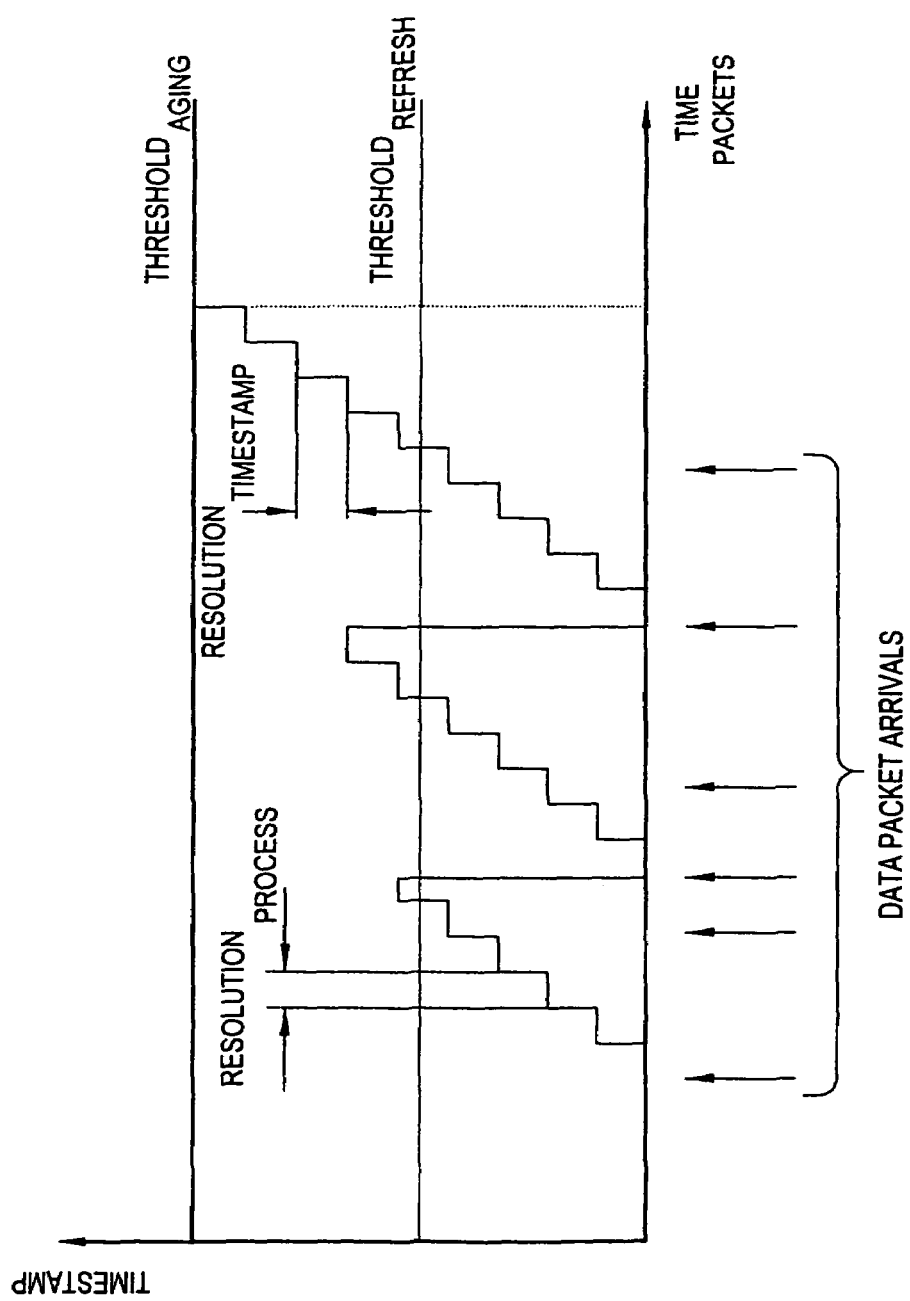
FIG. 11 depicts a timing diagram for address aging and address refreshing.

FIG. 11 depicts a timing diagram for MAC address aging and MAC address refreshing. Specifically, timing diagram 1100 depicts relationships between MAC address aging functions and MAC address refresh functions. The timing diagram 1100 depicts time along the x-axis (including times at which packets arrive at the line card) and the MAC address aging timestamp along the y-axis. The time increases along the x-axis. The MAC address aging timestamp increases along the y-axis (in steps since the MAC address aging timestamp is incremented periodically). The MAC address aging timestamp counts toward threshold$_{refresh}$ and threshold$_{aging}$ (being compared to each under different conditions, as described herein). If the MAC address aging timestamp exceeds the threshold$_{refresh}$ parameter, the MAC address entry is updated by resetting the associated MAC address aging times tamp. If the MAC address aging timestamp exceeds the threshold$_{aging}$, the MAC address entry is invalidated.

The timing diagram includes relationships between various parameters, including the resolution$_{process}$ parameter (measured with respect to time) and resolution$_{timestamp}$, threshold$_{refresh}$, and threshold$_{aging}$ parameters (measured with respect to the value of the MAC address aging timestamp). The parameters resolution$_{process}$ and resolution$_{timestamp}$ are related by a parameter (denoted as $C_{ts}$) such that resolution$_{timestamp}$=resolution$_{process}$×$C_{ts}$. In one embodiment, the parameter $C_{ts}$ has a default value of 1/sec. An actual aging time (denoted as $t_{aging}$) may be computed based on the resolution$_{process}$, resolution$_{timestamp}$, and $C_{ts}$ parameters, as follows: $t_{aging}$<[(resolution$_{process}$+resolution$_{timestamp}$)/$C_{ts}$]. Accordingly, uncertainty is small if resolution$_{process}$<<resolution$_{timestamp}$.

As described herein, the refresh threshold (threshold$_{refresh}$) is employed to ensure that refresh LRPs are not generated for every received data packet (since such LRPs would overwhelm the learning and re-learning LRPs and data packets distributed in the forwarding plane). As described herein, the aging threshold (threshold$_{aging}$) is employed to ensure that invalid MAC address entries do not remain in the forwarding database longer than necessary (e.g., when a terminal moves from one part of the network to another part of the network). According to the depicted timing diagram, a MAC address entry is aged out (i.e., invalidated) if a data packet for the associated MAC address has not been sent for at least: [(threshold$_{aging}$−threshold$_{refresh}$+resolution$_{timestamp}$)/$C_{ts}$].

Although primarily depicted and described herein with respect to one aging threshold for all MAC addresses, in one embodiment, each MAC address may be assigned an associated aging threshold. Although primarily depicted and described herein with respect to a static aging threshold, in one embodiment the aging threshold (or aging thresholds if each MAC address is assigned an associated aging threshold) may be dynamically modified. For example, the aging threshold (or one or more of multiple aging thresholds where each MAC address is assigned its own aging threshold) may be modified in response to network operator commands, changing network traffic conditions, and the like, as well as various combinations thereof.

Although enhanced MAC address updating according to the present invention is primarily depicted and described herein as ingress MAC address updating, enhanced MAC address updating according to the present invention may be implemented as egress MAC address updating. In a distributed bridge, since data packets may enter the bridge on one line card and exit the bridge on a different line card, packet processing functionality must be present on both the ingress side of each line card and the egress side of each line card. Since packet processing functionality is implemented on both the ingress side and egress side of each line card, MAC address updating may be performed on the ingress side of each line card or the egress side of each line card, or a combination of both.

As described herein, generalized MAC address updating, which may be implemented as ingress MAC address updating or egress MAC address updating, is depicted and described herein with respect to FIG. 1-FIG. 11. As such, depictions and descriptions provided herein with respect to FIG. 1-FIG. 11 may be generally applicable to both ingress MAC address updating and egress MAC address updating. For purposes of clarity in illustrating that both ingress MAC address updating and egress MAC address updating may be performed in accordance with the present invention, exemplary state diagrams for ingress MAC address updating and egress MAC address updating are depicted and described herein with respect to FIG. 12 and FIG. 13, respectively.

Figure 12:
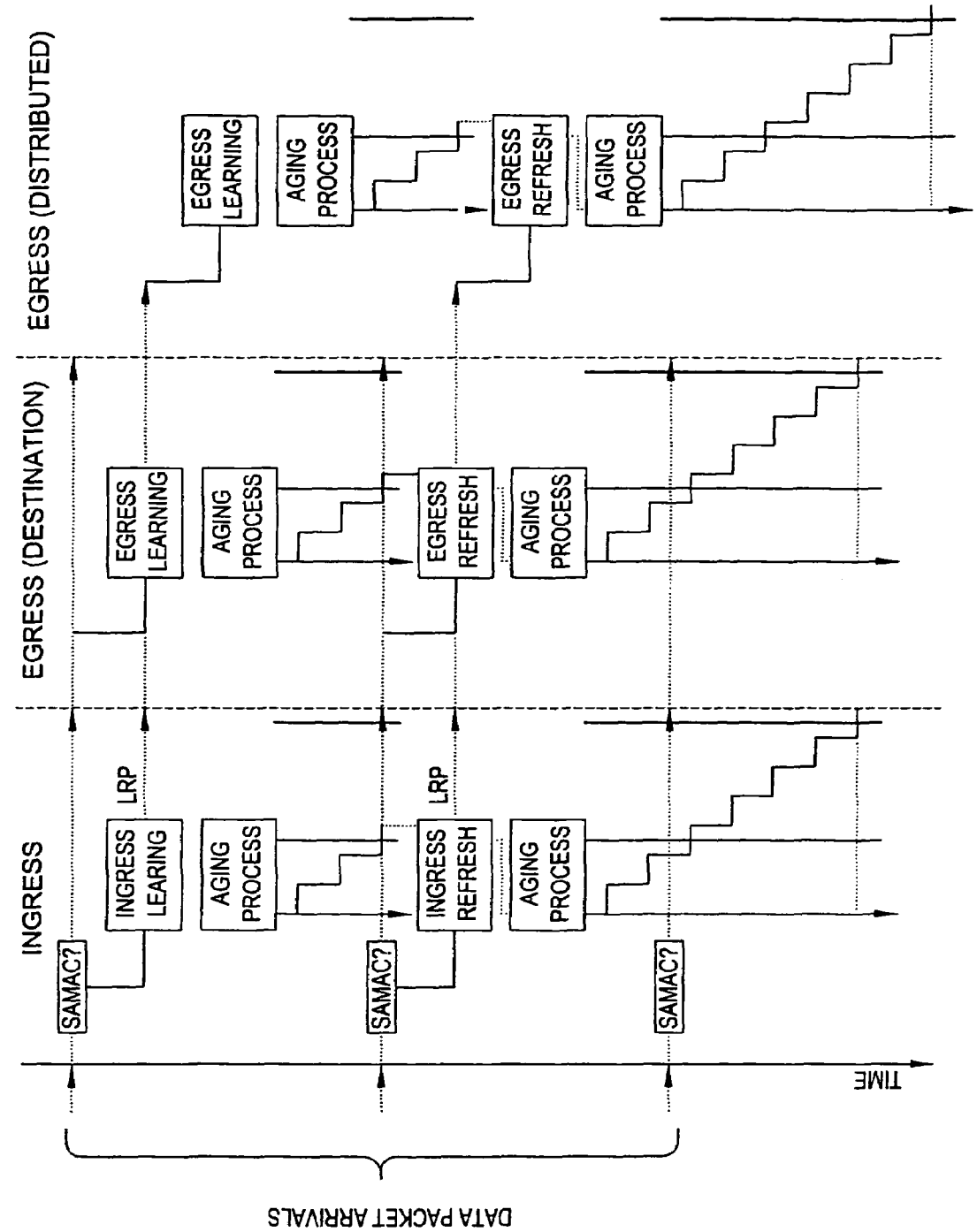
FIG. 12 depicts a state diagram for ingress-based distributed address updates according to one embodiment of the present invention.

FIG. 12 depicts a state diagram for ingress-based distributed MAC address updates according to one embodiment of the present invention. As depicted in state diagram 1200 of FIG. 12, data packets are received at an ingress line card over time (depicted on the y-axis). As each data packet is received, the data packet is forwarded to an egress line card (denoted as egress (destination)) and, further, an associated MAC address update operation may be performed on the ingress line card. If a MAC address update operation is performed on the ingress line card for a received data packet, an LRP is generated by the ingress line card and distributed to other ones of the line cards and, the other line cards, upon receiving the LRP, perform that MAC address update operation. An aging function (illustratively, MAC address aging process 930 of FIG. 9) is maintained on each line card.

Figure 13:
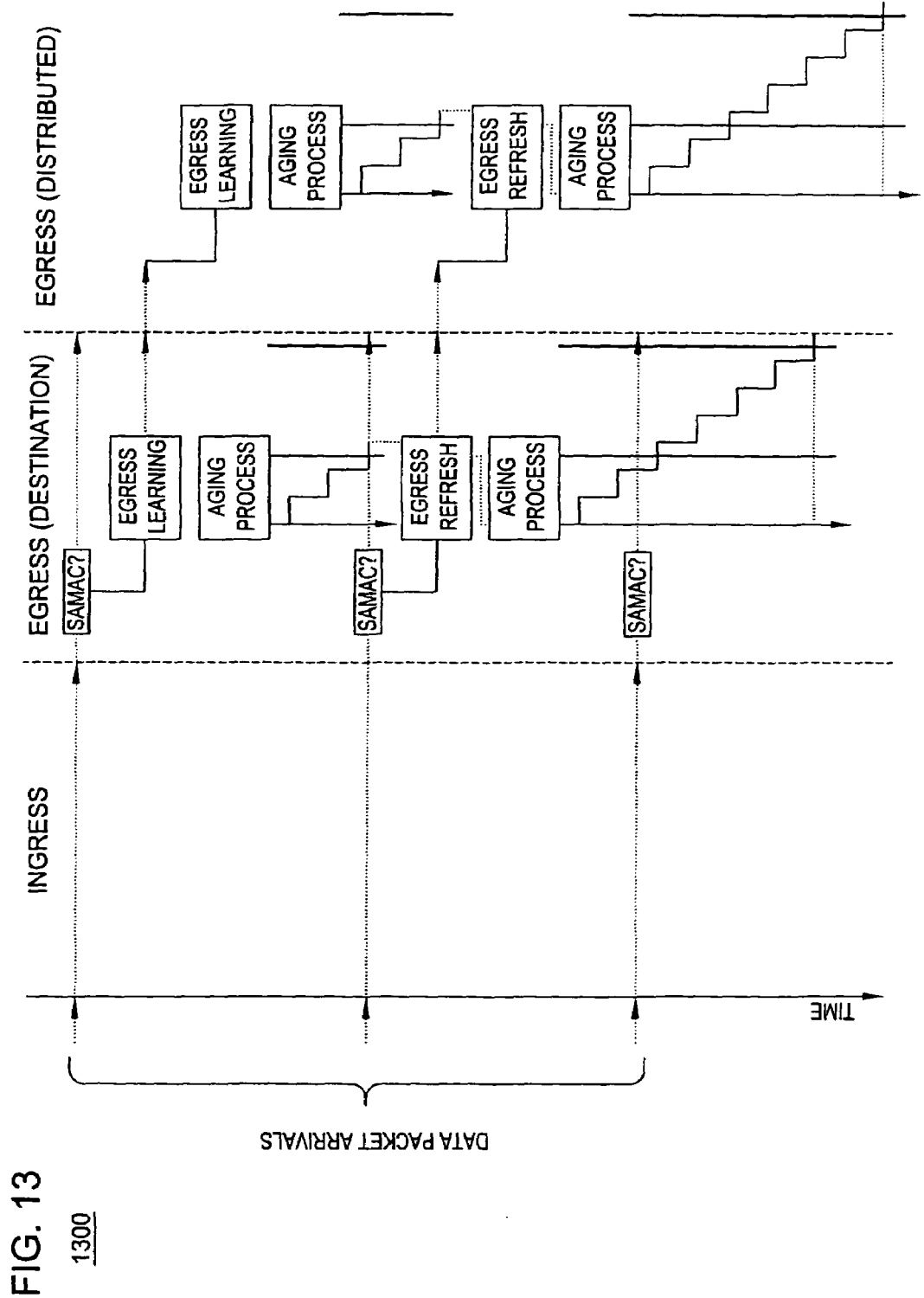
FIG. 13 depicts a state diagram for egress-based distributed address updates according to one embodiment of the present invention.

FIG. 13 depicts a state diagram for egress-based distributed MAC address updates according to one embodiment of the present invention. As depicted in state diagram 1300 of FIG. 13, data packets are received at an ingress line card over time (depicted on the y-axis). As each data packet is received, the data packet is forwarded to an egress line card (denoted as egress (destination)); however, no associated MAC address update operation is performed on the ingress line card. Rather, upon receiving the forwarded data packet, the egress line card may perform a MAC address update operation. If a MAC address update operation is performed on the egress line card for a received data packet, an LRP is generated by the egress line card and distributed to other ones of the line cards, and the other line cards, upon receiving the LRP, perform that MAC address update operation. An aging function (illustratively, MAC address aging process 930 of FIG. 9) is maintained on each line card.

Although primarily depicted and described herein with respect to performing enhanced address update functions of the present invention in response to unicast data traffic, enhanced address update functions of the present invention may be performed in response to other types of traffic (e.g., multicast traffic, broadcast traffic, and the like, as well as various combinations thereof). Furthermore, although omitted for purposes of clarity, enhanced address updates according to the present invention may be used in conjunction with various other functions of bridges networks. For example, enhanced address updates according to the present invention may be used in conjunction with loop prevention algorithms (e.g., Spanning Tree Algorithms and the like), port protection functions, virtual LAN (VLAN) functions, link aggregation functions, and the like, as well as various combinations thereof.

Although primarily depicted and described herein with respect to one specific switch architecture, the present invention is not limited to by switch architecture. In one embodiment, for example, one physical switch may be partitioned into multiple virtual switches, which may operate independent of each other. In another embodiment, for example, multiple physical switches may be operated as one logical switch. In other words, MAC address update functions of the present invention are not intended to be limited to specific switch architectures depicted and described herein for purposes of clearly depicting and describing such MAC address update functions.

Although primarily depicted and described herein with respect to a bridged Ethernet network, the present invention may be used to provide address update functions in various other types of networks (e.g., Token Ring networks, Fiber Distributed Data Interface (FDDI) networks, and the like, as well as various combinations thereof). Similarly, although primarily depicted and described herein with respect to enhanced address updates for Ethernet MAC addresses, enhanced address updates may be employed for various other types of addresses, depending on the underlying network. As such, the present invention is not intended to be limited to being implemented in bridged Ethernet networks; rather, the enhanced distributed address update functions of the present invention may be implemented in various other networks.

Figure 14:
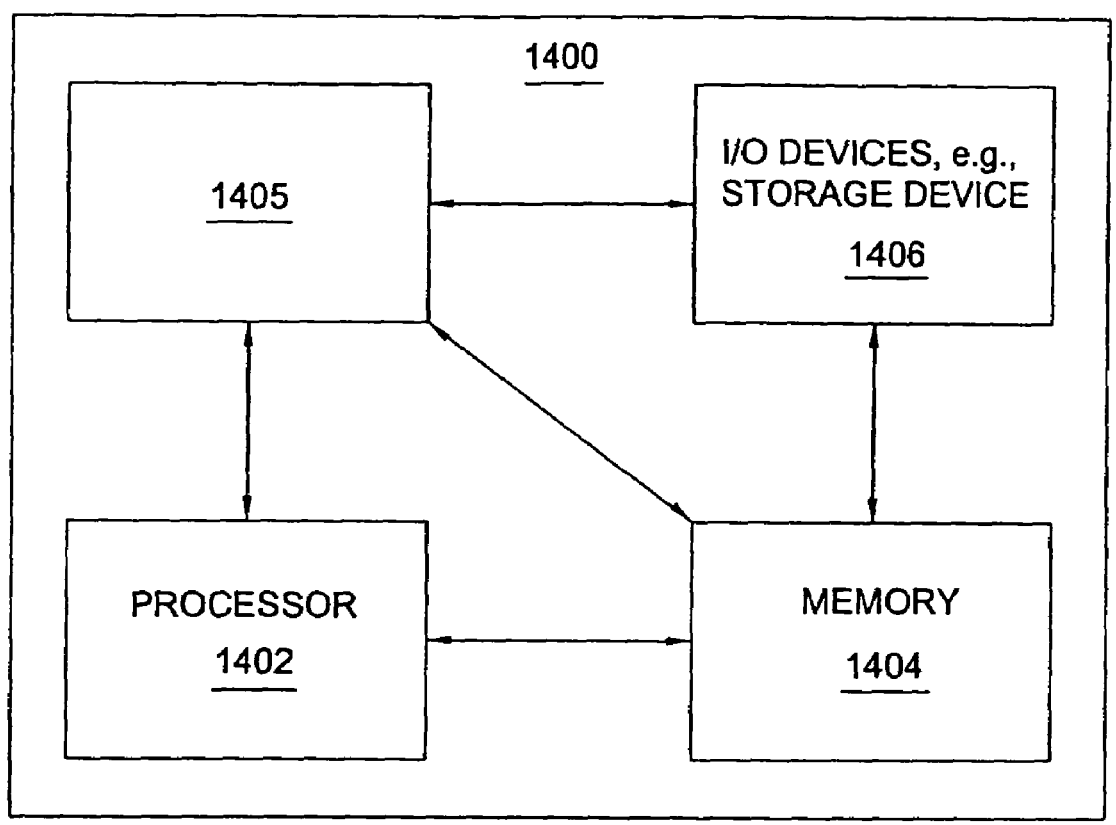
FIG. 14 depicts a high-level block diagram of a general-purpose computer suitable for use in performing the functions described herein.

FIG. 14 depicts a high-level block diagram of a general-purpose computer suitable for use in performing the functions described herein. As depicted in FIG. 14, system 1400 includes a processor element 1402 (e.g., a central processing unit (CPU)), a memory 1404, e.g., random access memory (RAM) and/or read only memory (ROM), an address updating module 1405, and various input/output devices 606 (e.g., storage devices, including but not limited to, a tape drive, a floppy drive, a hard disk drive or a compact disk drive, a receiver, a transmitter, a speaker, a display, an output port, and a user input device (such as a keyboard, a keypad, a mouse, and the like)).

It should be noted that the present invention may be implemented in software and/or in a combination of software and hardware, e.g., using application specific integrated circuits (ASIC), a general purpose computer or any other hardware equivalents. In one embodiment, the present address updating process 1405 can be loaded into memory 1404 and executed by processor 1402 to implement the functions as discussed hereinabove. As such, address updating process 1405 (including associated data structures) of the present invention can be stored on a computer readable medium or carrier, e.g., RAM memory, magnetic or optical drive or diskette and the like.

It is contemplated that some of the steps discussed herein as software methods may be implemented within hardware, for example, as circuitry that cooperates with the processor to perform various method steps. Portions of the present invention may be implemented as a computer program product wherein computer instructions, when processed by a computer, adapt the operation of the computer such that the methods and/or techniques of the present invention are invoked or otherwise provided. Instructions for invoking the inventive methods may be stored in fixed or removable media, transmitted via a data stream in a broadcast or other signal bearing medium, and/or stored within a working memory within a computing device operating according to the instructions.

Although various embodiments which incorporate the teachings of the present invention have been shown and described in detail herein, those skilled in the art can readily devise many other varied embodiments that still incorporate these teachings.

What is claimed is:

1. A method for synchronizing a plurality of forwarding databases of a respective plurality of line cards, the line cards comprising a first line card and a second line card, the method comprising:
   receiving a data packet at the first line card, wherein the data packet comprises a source address and is received via an ingress port, wherein the first line card comprises a forwarding database including a plurality of entries, wherein each of the entries includes respective entry information comprising a source address, an ingress port, and an aging timestamp;
   in response to a determination that one of the entries of the forwarding database includes the source address of the received packet and the ingress port via which the packet is received, determining whether the aging timestamp of the one of the entries satisfies a refresh threshold;
   when the aging timestamp of the one of the entries satisfies the refresh threshold, resetting the aging timestamp of the one of the entries and generating a control packet adapted to enable an address refresh operation to be performed for the source address on the second line card; and
   propagating the control packet toward the second line card via a data forwarding path between the first line card and the second line card.

2. The method of claim 1, wherein generating the control packet comprises generating a copy of the data packet and modifying the copy of the data packet to form thereby the control packet.

3. The method of claim 2, wherein modifying the copy of the data packet comprises:
   setting one or more bits of a data packet header of the copy of the data packet.

4. The method of claim 2, wherein modifying the copy of the data packet comprises:
   removing a payload of the copy of the data packet.

5. The method of claim 2, wherein the data packet is a first data packet, the method further comprising:
   receiving a second data packet at the first line card;
   in response to a determination to perform an address update operation for the second data packet, generating a second control packet adapted to enable an address update operation to be performed on the second line card; and
   propagating the second control packet toward the second line card via the data forwarding path between the first line card and the second line card.

6. The method of claim 5, wherein determining whether to perform an address update operation for the second data packet comprises:
   determining a source address of the second data packet;
   determining whether an entry for the source address exists in the forwarding database of the first line card.

7. The method of claim 6, further comprising:
   when an entry for the source address does not exist in the forwarding database of the first line card, performing an address learning operation comprising adding a new entry for the source address to the forwarding database of the first line card, wherein the new entry for the source address comprises the source address, an associated ingress port on which the second data packet is received, and an aging timestamp.

8. The method of claim 6, further comprising:
   when an entry for the source address exists in the forwarding database of the first line card, determining whether an ingress port included in the entry for the source address matches an ingress port associated with the second data packet.

9. The method of claim 8, further comprising:
when the ingress ports match, determining whether to perform an address refresh operation.

10. The method of claim 8, further comprising:
when the egress ports do not match, performing an address relearning operation comprising:
updating an ingress port of the entry for the source address; and
resetting an aging timestamp of the entry for the source address.

11. The method of claim 1, further comprising:
running an address aging process on the first line card, the address aging process comprising:
for each of the entries of the forwarding database of the first line card, determining whether an address aging timestamp associated with the entry satisfies an aging threshold;
for each of the entries of the forwarding database of the first line card for which the associated address aging timestamp does not satisfy the aging threshold, incrementing the address aging timestamp associated with the entry; and
for each of the plurality of entries of the forwarding database of the first line card for which the associated address aging timestamp satisfies the aging threshold, invalidating the entry.

12. An apparatus for synchronizing a plurality of forwarding databases of a respective plurality of line cards, the apparatus comprising:
a first line card, the first line card comprising:
a forwarding database configured to include a plurality of entries, wherein each of the entries is configured to include respective entry information comprising a source address, an ingress port, and an aging timestamp; and
a processor configured to:
receive a data packet, wherein the data packet comprises a source address and is received via an ingress port;
in response to a determination that one of the entries of the forwarding database includes the source address of the received packet and the ingress port via which the packet is received, determine whether the aging timestamp of the one of the entries satisfies a refresh threshold;
when the aging timestamp of the one of the entries satisfies the refresh threshold, reset the aging timestamp of the one of the entries and generate a control packet adapted to enable an address refresh operation to be performed for the source address on the second line card; and
propagate the control packet toward the second line card via a data forwarding path between the first line card and the second line card.

13. The apparatus of claim 12, wherein, to generate the control packet, the processor is configured to:
generate a copy of the data packet and modify the copy of the data packet to form thereby the control packet.

14. The apparatus of claim 13, wherein, to modify the copy of the data packet, the processor is configured to:
set one or more bits of a data packet header of the copy of the data packet.

15. The apparatus of claim 13, wherein, to modify the copy of the data packet, the processor is configured to:
remove a payload of the copy of the data packet.

16. The apparatus of claim 12, wherein the data packet is a first data packet, wherein the processor is configured to:
receive a second data packet;
in response to a determination to perform an address update operation for the second data packet, generate a second control packet adapted to enable an address update operation to be performed on the second line card; and
propagate the second control packet toward the second line card via the data forwarding path between the first line card and the second line card.

17. The apparatus of claim 16, wherein, to determine whether to perform an address update operation for the second data packet, the processor is configured to:
determine a source address of the second data packet;
determine whether an entry for the source address exists in the forwarding database of the first line card.

18. The apparatus of claim 17, wherein the processor is configured to:
when an entry for the source address does not exist in the forwarding database of the first line card, perform an address learning operation comprising adding a new entry for the source address to the forwarding database of the first line card, wherein the new entry for the source address comprises the source address, an associated ingress port on which the second data packet is received, and an aging timestamp.

19. The apparatus of claim 17, wherein the processor is configured to:
when an entry for the source address exists in the forwarding database of the first line card, determine whether an ingress port included in the entry for the source address matches an ingress port associated with the second data packet.

20. The apparatus of claim 19, wherein the processor is configured to:
when the ingress ports match, determine whether to perform an address refresh operation.

21. The apparatus of claim 19, wherein the processor is configured to:
when the egress ports do not match, perform an address relearning operation comprising:
updating an ingress port of the entry for the source address; and
resetting an aging timestamp of the entry for the source address.

22. The apparatus of claim 12, wherein the processor is configured to:
run an address aging process on the first line card, wherein to run the address aging process the processor is configured to:
for each of the entries of the forwarding database of the first line card, determine whether an address aging timestamp associated with the entry satisfies an aging threshold;
for each of the entries of the forwarding database of the first line card for which the associated address aging timestamp does not satisfy the aging threshold, increment the address aging timestamp associated with the entry; and
for each of the plurality of entries of the forwarding database of the first line card for which the associated address aging timestamp satisfies the aging threshold, invalidate the entry.

23. A non-transitory computer-readable storage medium storing instructions which, when executed by a computer, cause the computer to perform a method for synchronizing a plurality of forwarding databases of a respective plurality of line cards, the line cards comprising a first line card and a second line card, the method comprising:

receiving a data packet at the first line card, wherein the data packet comprises a source address and is received via an ingress port, wherein the first line card comprises a forwarding database including a plurality of entries, wherein each of the entries includes respective entry information comprising a source address, an ingress port, and an aging timestamp;

in response to a determination that one of the entries of the forwarding database includes the source address of the received packet and the ingress port via which the packet is received, determining whether the aging timestamp of the one of the entries satisfies a refresh threshold;

when the aging timestamp of the one of the entries satisfies the refresh threshold, resetting the aging timestamp of the one of the entries and generating a control packet adapted to enable an address refresh operation to be performed for the source address on the second line card; and propagating the control packet toward the second line card via a data forwarding path between the first line card and the second line card.

* * * * *